United States Patent
Kimura et al.

(10) Patent No.: US 9,843,261 B2
(45) Date of Patent: Dec. 12, 2017

(54) POWER CONVERSION APPARATUS

(71) Applicant: DENSO CORPORATION, Kariya, Aichi-pref. (JP)

(72) Inventors: Mitsunori Kimura, Kariya (JP); Daisuke Suekawa, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/458,261

(22) Filed: Mar. 14, 2017

(65) Prior Publication Data
US 2017/0264199 A1 Sep. 14, 2017

(30) Foreign Application Priority Data
Mar. 14, 2016 (JP) .................. 2016-049502

(51) Int. Cl.
*H02M 7/44* (2006.01)
*H02M 3/158* (2006.01)
(Continued)

(52) U.S. Cl.
CPC .............. *H02M 3/158* (2013.01); *G01K 1/02* (2013.01); *G01K 3/10* (2013.01); *H02M 7/44* (2013.01)

(58) Field of Classification Search
CPC ... H02M 2001/0003; H02M 2001/327; H02M 1/32; H02M 3/155; H02M 3/156; H02M 3/157; H02M 3/158; H02M 3/335; H02M 3/337; H02M 7/42; H02M 7/44; H02M 7/48; G01K 1/02; G01K 3/10
See application file for complete search history.

(56) References Cited

U.S. PATENT DOCUMENTS 8,976,551 B2 * 3/2015 Igarashi .................. B60L 3/003
363/56.02
9,595,908 B2 * 3/2017 Odaka ..................... H02P 29/68
(Continued)

FOREIGN PATENT DOCUMENTS

| JP | 2003-204028 A | 7/2003 |
| JP | 2007-195343 A | 8/2007 |
| JP | 2011-027625 A | 2/2011 |

*Primary Examiner* — Emily P Pham
*Assistant Examiner* — Shahzeb K Ahmad
(74) *Attorney, Agent, or Firm* — Oliff PLC

(57) ABSTRACT

At least one monitor circuit monitors a temperature of at least one monitored element of switching elements of a power conversion circuit. At least one arrival determination circuit determines that a temperature of at least one non-monitored element of the switching elements has increased and reached a passing temperature. Based on the temperature of the monitored element and arrival determination signals, a temperature estimating unit obtains a temperature difference by subtracting a current temperature of the monitored and non-monitored element at the arrival determination time from an output limitation temperature set for each of the monitored and non-monitored element, and estimates a limitation subject temperature of the monitored or non-monitored element having a smallest temperature difference among the temperature differences. An output limiting unit starts output limitation of the power conversion circuit when the limitation subject temperature reaches the output limitation temperature of the monitored element or the non-monitored element.

15 Claims, 18 Drawing Sheets

(51) Int. Cl.
    *G01K 3/10*     (2006.01)
    *G01K 1/02*     (2006.01)

(56) References Cited

U.S. PATENT DOCUMENTS

| | | | |
|---|---|---|---|
| 2013/0314132 A1* | 11/2013 | Fukuta | H03K 17/18 327/109 |
| 2014/0062373 A1* | 3/2014 | Fukui | H02P 29/68 318/472 |
| 2015/0188530 A1* | 7/2015 | Shinohara | H03K 3/011 327/172 |
| 2016/0111973 A1* | 4/2016 | Deflorio | H02P 27/06 318/400.02 |
| 2016/0315533 A1* | 10/2016 | Wagoner | H02M 1/4208 |

* cited by examiner

POWER CONVERSION APPARATUS

CROSS-REFERENCE TO RELATED APPLICATION

This application is based on and claims the benefit of priority from Japanese Patent Application No. 2016-049502, filed Mar. 14, 2016. The entire disclosure of the above application is incorporated herein by reference.

BACKGROUND

Technical Field

The present disclosure relates to a power conversion apparatus that includes a power conversion circuit that converts electric power through operation of a plurality of switching elements.

Related Art

Conventionally, regarding power conversion apparatuses that include a power conversion circuit, such as a boost converter or an inverter, a technology is known in which output limitation is applied to the power conversion circuit when the highest temperature of the temperatures of a plurality of switching elements reaches a predetermined temperature or higher. Hereafter, element refers to the switching element, unless otherwise noted. In addition, the temperature of the element that has the highest temperature among the plurality of elements is abbreviated and referred to as highest element temperature.

For example, in a motor drive apparatus disclosed in JP-A-2007-195343, a temperature detection diode and a temperature monitor circuit are provided for one of six elements configuring an inverter circuit. In addition, a temperature detection diode and a temperature detection circuit are provided for each of the remaining five elements that are not provided with the temperature monitor circuit. The temperature detection circuit detects that the element temperature has reached a predetermined temperature.

A controller serves as a temperature estimating means. The controller adds, to a monitored temperature detected by the temperature monitor circuit, a value read out from map data generated based on a model of heat transfer among a plurality of switching elements, and thereby estimates a highest element temperature estimated value. In addition, when it is detected that the temperature of any of the elements provided with the temperature detection circuit has reached a predetermined temperature, the controller sets, as a correction value, the difference between the highest element temperature estimated value and the predetermined temperature. The controller adds the correction value to the highest element temperature estimated value, and sets the sum as a post-correction highest element temperature estimated value.

The heat transfer model used in the apparatus disclosed in JP-A-2007-195343 is prescribed taking into consideration thermal interference between elements that are arranged adjacent to each other in the element arrangement on a substrate, and the like. However, reliability of the heat transfer map data may decrease due to deterioration of inter-element heat transfer characteristics and the like. The highest element temperature may not be accurately estimated.

In addition, variable factors in the element temperatures acquired by the temperature estimating means are present in actuality. The factors include, for example, output error in the temperature detection diode, detection error in the temperature monitor circuit and the temperature detection circuits, variations in characteristics among the plurality of elements, and external disturbances. However, the conventional technology in JP-A-2007-195343 focuses only on the highest element temperature and gives no consideration to such variations.

Therefore, from the perspective of reliably protecting the elements from overheating, an output limitation temperature is required to be set with the addition of a safety margin that provides allowance taking into account the entirety of the various variable factors. Consequently, excessive output limitations tend to be applied. Element performance cannot be effectively realized. As a result, the overall apparatus may become larger in size due to higher-specification switching elements and larger circuit scale.

SUMMARY

It is thus desired to provide a power conversion apparatus that enables an output limitation temperature to be set as high as possible, taking into consideration variations in acquired element temperatures, and effectively realizes element performance.

An exemplary embodiment provides a power conversion apparatus that includes a power conversion circuit, a plurality of temperature output units, at least one monitor circuit, at least one arrival determination circuit, a temperature estimating unit, and an output limiting unit.

The power conversion circuit converts input electric power and outputs the converted electric power through operation of a plurality of switching elements.

The plurality of temperature output units output analog temperature signals based on individual element temperatures of the plurality of switching elements.

The monitor circuit is provided in correspondence to at least one monitored element selected from the plurality of switching elements. The monitor circuit detects over time a temperature of the monitored element, based on the analog temperature signals received from the temperature output units.

The arrival determination circuit is provided in correspondence to each non-monitored element that is at least one switching element other than the monitored element. The arrival determination circuit determines that the temperature of the corresponding non-monitored element has increased and reached a predetermined passing temperature based on the analog temperature signals received from the temperature output units.

The temperature estimating unit estimates a limitation subject temperature that is the temperature of the monitored element or the non-monitored element having a smallest temperature difference from its output limitation temperature among the switching elements, based on the temperature of the monitored element and the arrival determination signals from the arrival determination circuits. In other words, the temperature difference is a temperature obtained by subtracting a current temperature of an element from an output limitation temperature set for each element.

The output limiting unit starts output limitation of the power conversion circuit when the limitation subject temperature reaches the output limitation temperature of the monitored element or the non-monitored element.

When the arrival determination circuit determines that the element temperature of any of the non-monitored elements has reached the passing temperature before any monitored temperature reaches the passing temperature, the temperature estimating unit recognizes that non-monitored element as a non-monitored specific element.

Then, when the temperature difference of the non-monitored specific element is smaller than the temperature difference of the monitored element at the arrival determination time, the temperature estimating unit estimates a temperature obtained by adding a difference between the passing temperature and the monitored temperature at the arrival determination time to the temperature of the monitored element, as a learning temperature of the non-monitored specific element.

The output limiting unit sets the temperature of the monitored temperature as the limitation subject temperature before the arrival determination time, and determines application of output limitation with the learning temperature of the non-monitored specific element as the limitation subject temperature after the arrival determination time.

In the present disclosure, the output limitation temperatures are set taking into consideration temperature variations for each element. In addition, the application of output limitation is determined with focus on the temperature of the element having the smallest temperature difference, which is the difference between the current temperature and the output limitation temperature of the element.

Therefore, a safety margin set to absorb variations can be reduced. The output limitation temperature can be set as high as possible. As a result, excessive application of output limitation can be suppressed and element performance can be effectively realized. Consequently, use of switching elements having higher specifications is avoided and contribution is made to size reduction of the overall apparatus.

DESCRIPTION OF THE EMBODIMENTS

Embodiments of a power conversion apparatus will hereinafter be described with reference to the drawings. Configurations that are approximately identical among the plurality of embodiments are given the same reference numbers. Descriptions thereof are omitted. In addition, first to fifth embodiments below are collectively referred to as the present embodiments.

First Embodiment

A power conversion apparatus according to the first embodiment will be described with reference to FIGS. 1 to 8B. Here, the first and second embodiments both reference FIGS. 1 to 3.

Figure 1:
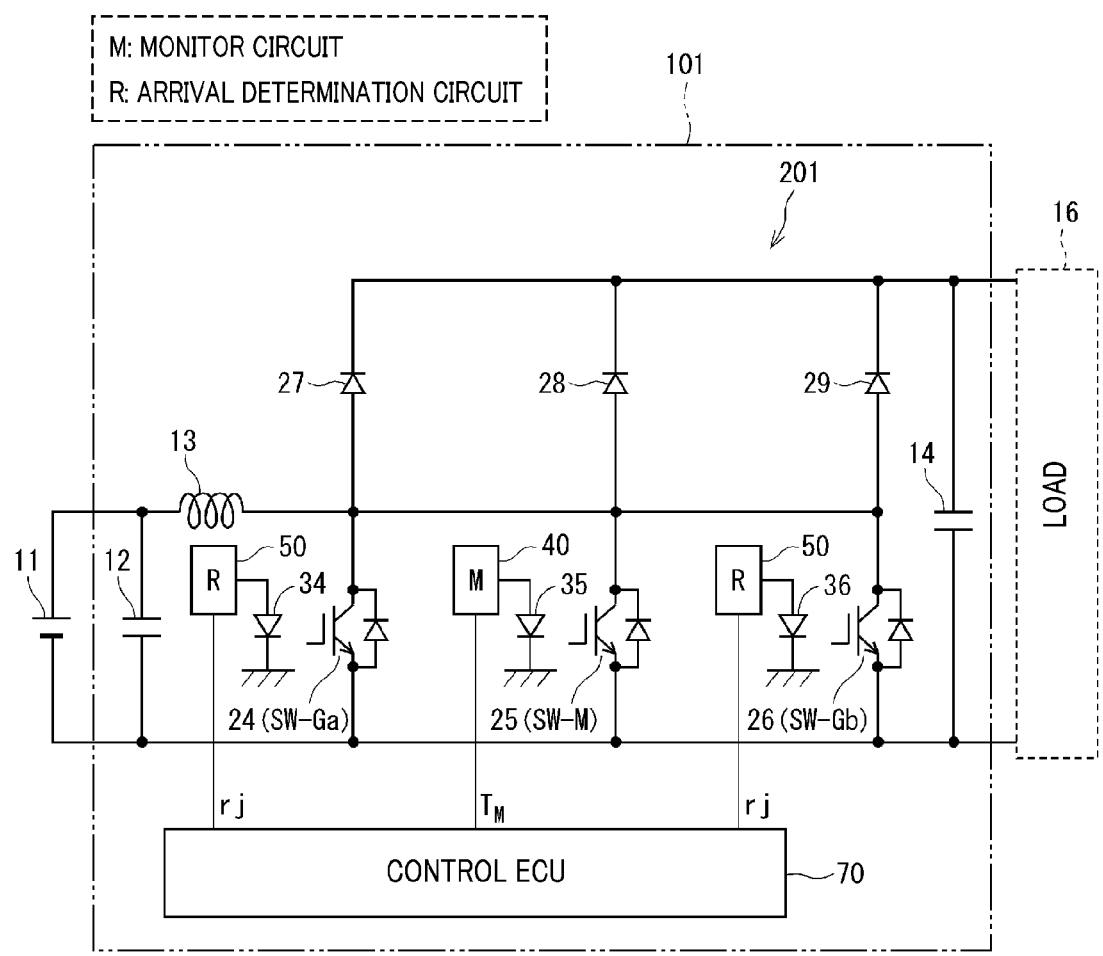
FIG. 1 is an overall configuration diagram of a power conversion apparatus according to first and second embodiments.

As shown in FIG. 1, a power conversion apparatus 101 according to the first and second embodiments include a boost converter 201, temperature-sensitive diodes 34, 35, and 36, a monitor circuit 40, arrival determination circuits 50, a control electronic control unit (ECU) 70, and the like. The boost converter 201 serves as a power conversion circuit. The temperature-sensitive diodes 34, 35, and 36 serve as temperature output units (element temperature output units).

The boost converter 201 is connected between a battery 11 and a load 16. The boost converter 201 boosts the direct-current voltage of the battery 11 and outputs the boosted direct-current voltage to the load 16. For example, the load 16 may be an inverter that is a power conversion circuit according to the fifth embodiment.

A filter capacitor 12 and a reactor 13 are provided on the battery 11 side of the boost converter 201. The filter capacitor 12 removes power supply noise. The reactor 13 is connected to a positive terminal of the battery 11 and stores energy. A smoothing capacitor 14 is provided on the load 16 side of the boost converter 201. The smoothing capacitor 14 is charged with the boosted voltage. Low-potential-side electrodes of the filter capacitor 12 and the smoothing capacitor 14 are connected to a negative terminal of the battery 11.

A plurality of switching elements 24, 25, and 26 are connected in parallel between an output terminal of the reactor 13 and the low-potential side of the smoothing capacitor 14. Throughout the embodiments below, the switching element is, for example, an insulated-gate bipolar transistor (IGBT). The switching elements 24, 25, and 26 are provided with freewheeling diodes. The freewheeling diode allows a flow of current from the low-potential side to the high-potential side. A plurality of backflow prevention diodes 27, 28, and 29 are connected in parallel between the output terminal of the reactor 13 and the high-potential side of the smoothing capacitor 14. The backflow prevention diodes 27, 28, and 29 prevent current backflow from the load 16 side.

The operation of the boost converter 201 per se is known technology. Therefore, a detailed description thereof is omitted.

The plurality of switching elements 24, 25, and 26 are basically identical to each other in terms of specification and characteristics. The plurality of backflow prevention diodes 27, 28, and 29 are also basically identical to each other in terms of specification and characteristics. The backflow prevention diodes 27, 28, and 29 will not be further mentioned.

In addition, the plurality of switching elements 24, 25, and 26 are presumed to be set in an environment in which heat-release conditions during energization do not significantly differ. A typical example is the plurality of switching elements 24, 25, and 26 being set on the same substrate. This presumption similarly applies throughout the embodiments below.

However, even under such a presumption, in actuality, various factors for variation in the element temperatures of the switching elements are present. This point will be described in detail hereafter. In the present specification, element temperature refers to the temperature of a switching element configuring the power conversion circuit.

In the boost converter 201 that is energized by a large current, in particular, a special component having a high rating is required when the boost converter 201 is to be configured by a single switching element. However, standard components can be used as a result of a plurality of switching elements being connected in parallel. In addition, as a result of the plurality of switching elements being redundantly provided, should an open fault or the like occur in a switching element during energization, operation can be continued using the other switching elements.

In this manner, the power conversion circuit provided in the power conversion apparatus according to each embodiment is composed of a plurality of switching elements that operate on the same level. The number of switching elements is not limited to three, and may be two or four or more. However, for the purpose of describing the output limitation process, described hereafter, a mode in which the number of switching elements is three is used as a specific example.

Here, the arrangement of the three switching elements 24, 25, and 26 shown in FIG. 1 is presumed to correspond to the mounting arrangement on a substrate. In this case, the switching elements 24 and 26 arranged on the outer sides are thought to be at a relative advantage in terms of heat release. Meanwhile, the switching element 25 arranged between the other switching elements 24 and 26 is thought to be at a relative disadvantage in terms of heat release and thought to have a tendency to accumulate heat. Therefore, under a presumption that heat generation resulting from energization of the three elements is identical, it is assumed that the temperature of the switching element 25 will be the highest.

In JP-A-2007-195343 that describes a conventional technology, the following technology is disclosed as a third embodiment. That is, the highest element temperature is estimated in a power conversion circuit having a configuration such as described above. In this technology, the temperature of only the switching element 25 that is highly likely to have the highest temperature is monitored. Arrival at a predetermined temperature is detected for the other switching elements 24 and 26. It is stated in JP-A-2007-195343 that the apparatus can be made smaller in size, compared to a configuration in which the temperatures of all switching elements are monitored.

According to the present embodiments, a configuration similar to that of the conventional technology in JP-A-2007-195343 is used as the basic configuration for temperature detection. The three temperature-sensitive diodes 34, 35, and 36 are respectively provided in correspondence to the three switching elements 24, 25, and 26. The anode-cathode voltage of each of the temperature-sensitive diodes 34, 35, and 36 changes based on the individual element temperature. The temperature-sensitive diodes 34, 35, and 36 output signals of the respective anode-cathode voltages to the monitor circuit 40 or the arrival determination circuit 50 as analog temperature signals.

Here, the switching element 25 at the center is selected as a monitored element SW-M. The remaining outer switching elements 24 and 26 are general elements (non-monitored elements) SW-Ga and Gb. In the description hereafter, the monitored element SW-M and the general elements SW-Ga and Gb are preferentially used over the reference numbers 24, 25, and 26 to identify the switching elements.

In this example, a single monitored element SW-M and two general elements SW-Ga and Gb are provided. In general terms, at least one monitored element SW-M is selected from the plurality of switching elements configuring the power conversion circuit. In addition, at least one of the switching elements other than the monitored element corresponds to general elements SW-G*. Hereafter, Ga, Gb, . . . are collectively referred to as G*. G* is also used as the reference number recited within the parentheses in the claims.

In FIG. 1, the monitor circuit 40 is denoted by the symbol M. The arrival determination circuit 50 is denoted by the symbol R.

The monitor circuit 40 is provided in correspondence to the switching element 25 that is the monitored element SW-M. The monitor circuit 40 detects a monitored temperature $T_M$ over time, based on the analog temperature signal received from the temperature-sensitive diode 35. The monitored temperature $T_M$ is the element temperature of the monitored element SW-M.

The arrival determination circuits 50 are provided in correspondence to the switching element 24 that is the general element SW-Ga and the switching element 26 that is the general element SW-Gb. The arrival determination circuits 50 determine that the element temperatures of the general elements SW-Ga and Gb have increased and reached a predetermined passing temperature $T_{OG}$, based on the analog temperature signals received from the temperature-sensitive diodes 34 and 36.

Notification of information on the monitored temperature $T_M$ outputted from the monitor circuit 40 and arrival determination signals rj outputted from the arrival determination circuits 50 are given to the control ECU 70.

The control ECU 70 is configured by a known microcomputer, a custom integrated circuit (IC), or the like. The microcomputer includes therein a central processing unit (CPU), a read-only memory (ROM), an input/output (I/O), a bus line connecting the CPU, ROM, and I/O, and the like (not shown). The microcomputer performs control through software processes and hardware processes. The software processes are performed by the CPU running programs stored in advance. The hardware processes are performed by a dedicated electronic circuit.

The control ECU 70 originally calculates drive signals for switching elements so as to output desired electric power to the load 16, based on command signals or feedback signals from an external source. However, according to the present embodiments, descriptions related to the typical drive control performed by the control ECU 70 and drawings of signal input and output are omitted. A characteristic process related to temperature detection will be described in detail.

Next, configurations of the monitor circuit 40 and the arrival determination circuit 50 will be described with reference to FIGS. 2 and 3. The reference numbers of the temperature-sensitive diodes in FIGS. 2 and 3 correspond to those in the configuration of the boost converter 201 in FIG. 1. The reference number of the temperature-sensitive diode connected to the monitor circuit 40 is 35. The reference numbers of the temperature-sensitive diodes connected to the arrival determination circuits 50 are 34 and 36. However, the monitor circuit 40 and the arrival determination circuit 50 may be connected to any temperature-sensitive diode. In addition, the symbol A in the drawings denotes an anode. The symbol K denotes a cathode. The circuit configurations in FIGS. 2 and 3 are approximately the same as the circuit configurations shown in JP-A-2007-195343.

Figure 2:
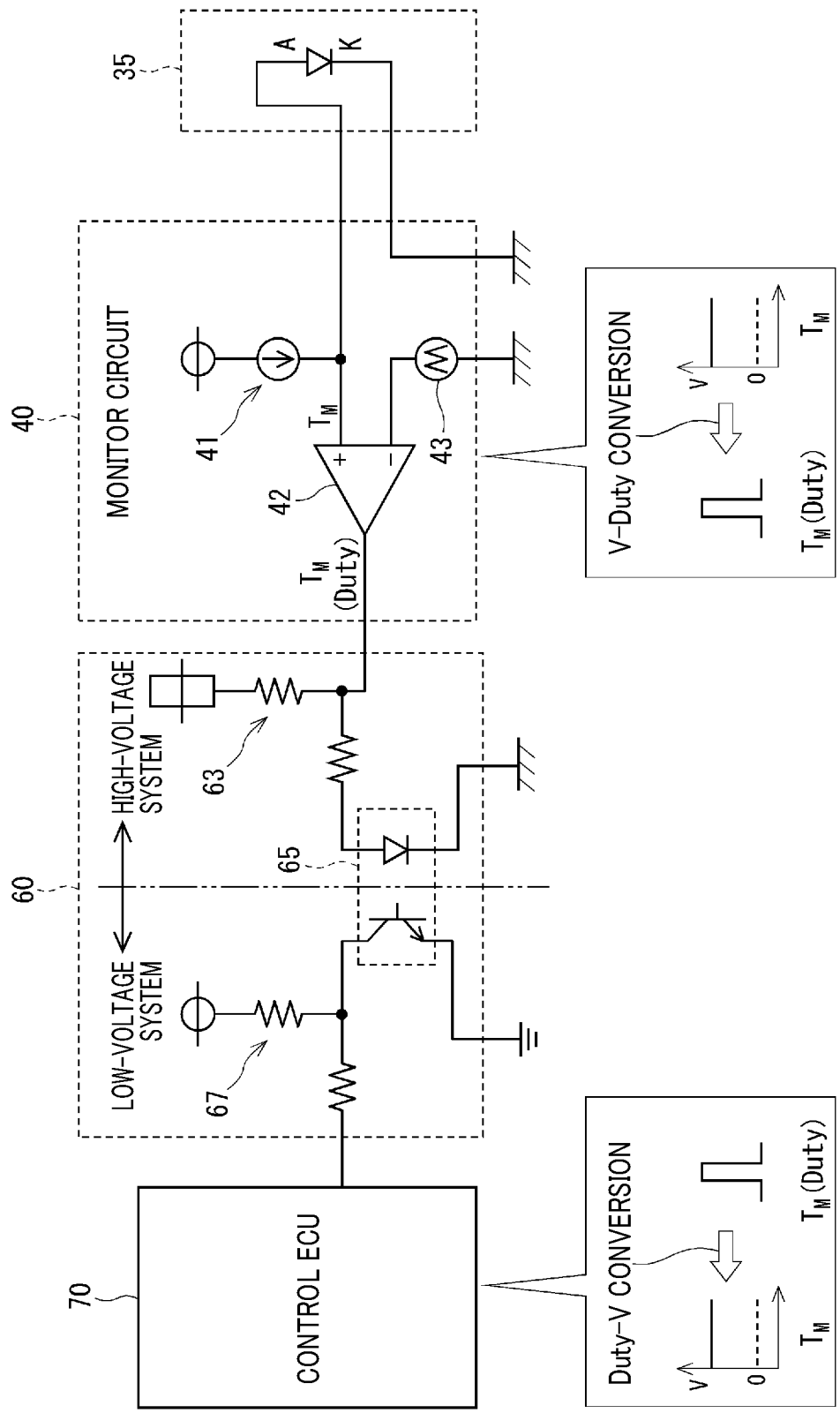
FIG. 2 is a schematic diagram of a monitor circuit and an insulated transmission circuit.
Figure 3:
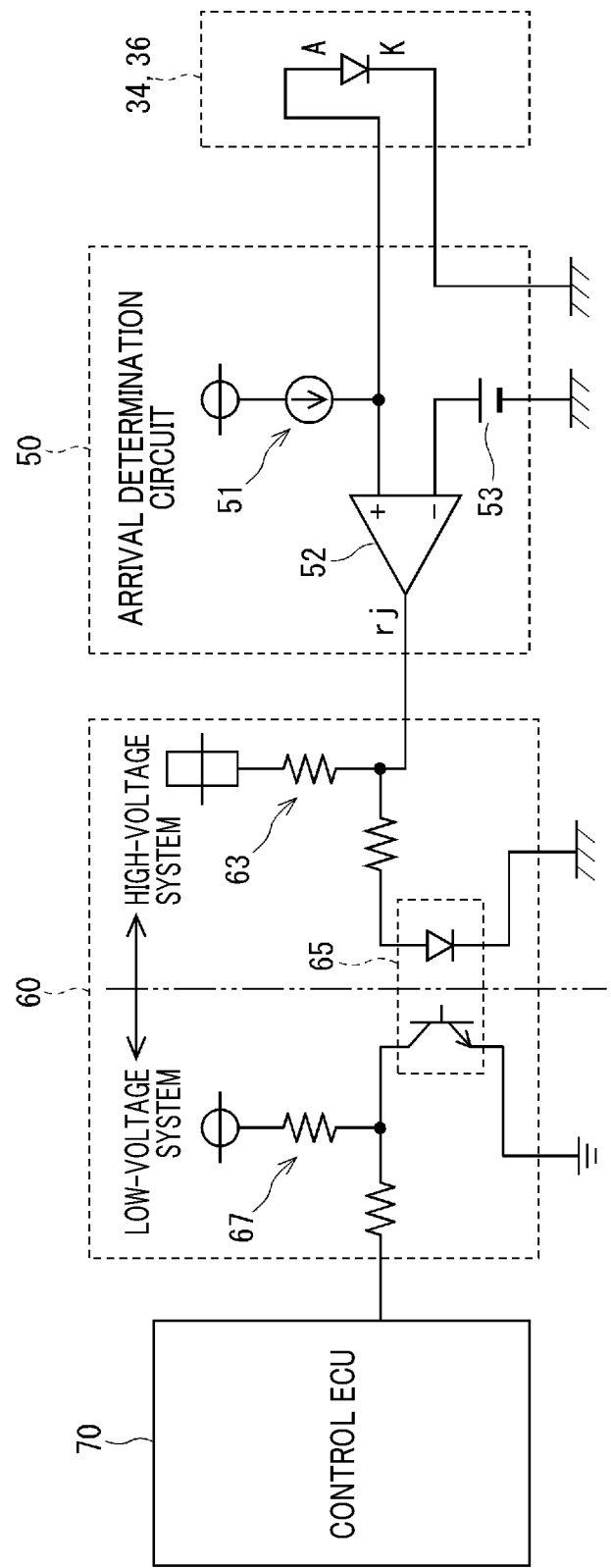
FIG. 3 is a schematic diagram of an arrival determination circuit and the insulated transmission circuit.

As shown in FIG. 2, the monitor circuit 40 has a constant-current supplying unit 41, a comparator 42, and a triangular-wave generation circuit 43.

The constant-current supplying unit 41 supplies the anode of the temperature-sensitive diode 35 with a constant current. In addition, the cathode of the temperature-sensitive diode 35 is connected to reference potential. The temperature of the monitored element SW-M subjected to temperature detection, that is, the anode-cathode voltage based on the monitored temperature $T_M$ is input to a positive terminal of the comparator 42 as the analog temperature signal.

Meanwhile, a triangular wave generated by the triangular-wave generation circuit 43 is input to a negative terminal of the comparator 42. A voltage value of the analog temperature signal based on the monitored temperature $T_M$ is compared to the triangular wave and is thereby successively converted to a duty signal. The duty signal is then outputted from the comparator 42. In this manner, the monitor circuit 40 detects the monitored temperature $T_M$ over time.

The insulated transmission circuit 60 includes a photocoupler 65, a high-voltage-side resistance circuit 63, and a low-voltage-side resistance circuit 67. The insulated transmission circuit 60 performs insulated transmission of signals between a high-voltage system and a low-voltage system. The output signal from the comparator 42 is transmitted to the control ECU 70 via the insulated transmission circuit 60.

The control ECU 70 converts the duty signal of the monitored temperature $T_M$ to a voltage signal. Subsequent processes performed by the control ECU 70 will be described hereafter.

As shown in FIG. 3, the arrival determination circuit 50 has a constant-current supplying unit 51, a comparator 52, and a threshold power supply 53. The configurations of the constant-current supplying unit 51 and the comparator 52 are similar to those of the monitor circuit 40. The anode-cathode voltage based on the element temperature of the corresponding general element SW-Ga or Gb is input to a positive terminal of the comparator 52 as the analog temperature signals. The threshold power supply 53 that is connected to a negative terminal of the comparator 52 prescribes a threshold voltage corresponding to the passing temperature $T_{OG}$, described hereafter.

When the element temperature of the corresponding general element SW-Ga or Gb is lower than the passing temperature $T_{OG}$, the output of the comparator 52 is turned OFF. When the element temperature of the corresponding general element SW-Ga or Gb reaches the passing temperature $T_{OG}$, the output of the comparator 52 is turned ON. The output signal is transmitted to the control ECU 70 as the arrival determination signal rj, via the insulated transmission circuit 60.

Next, two types of configurations of the control ECU 70 will be described as the first embodiment and the second embodiment. Hereafter, the two configurations are differentiated by the reference number of the control ECU according to the first embodiment being 701 and the reference number of the control ECU according to the second embodiment being 702.

Figure 4:
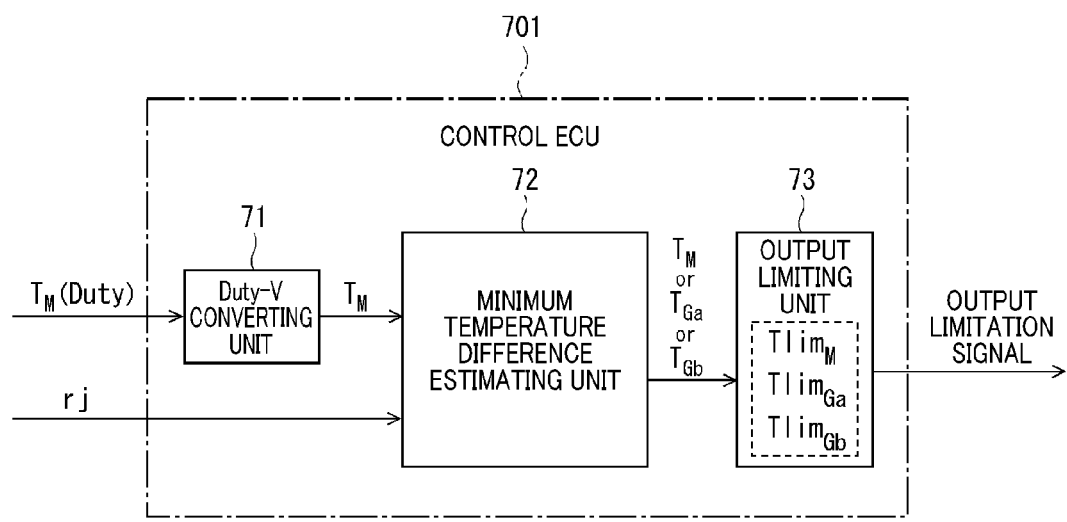
FIG. 4 is a control block diagram of a control ECU according to the first embodiment.

As shown in FIG. 4, the control ECU 701 according to the first embodiment has a duty-V converting unit 71, a minimum temperature difference (temperature for extension, postponement, or delay) estimating unit (hereinafter referred to as a temperature estimating unit) 72, and an output limiting unit 73.

The duty-V converting unit 71 converts the duty signal of the monitored temperature $T_M$ received from the monitor circuit 40 via the insulated transmission circuit 60 to a voltage signal.

The temperature estimating unit 72 acquires the voltage signal of the monitored temperature $T_M$ from the duty-V converting unit 71. In addition, the temperature estimating unit 72 acquires the arrival determination signal rj indicating that the element temperature of the general element SW-Ga or Gb has reached the passing temperature $T_{OG}$.

Here, an output limitation temperature and a temperature difference (temperature for extension, postponement, or delay) that are concepts unique to the present embodiments will be described.

The output limitation temperature is the temperature at which output limitation is required to be applied to the power conversion circuit to protect an element from overheating when the element temperature of the three switching elements configuring the boost converter 201 rise to and above the output limitation temperature. Although the specifications and characteristics of the three switching elements are basically identical, in actuality, variations in element characteristics and variations related to temperature detection are present.

Therefore, a characteristic according to the present embodiments is that an appropriate output limitation temperature is set for each element. Hereafter, the respective output limitation temperatures of the elements are denoted by the following symbols:

Tlim$_M$: the output limitation temperature of the monitored element SW-M; and

Tlim$_{Ga}$, Tlim$_{Gb}$: the respective output limitation temperatures of the general elements SW-Ga and Gb.

In addition, these output limitation temperatures are collectively referred to as an output limitation temperature Tlim.

The temperature difference is a temperature obtained by the current temperature being subtracted from the output limitation temperature for each element. That is, the temperature difference indicates a margin in temperature rise until the current element temperature of the element reaches the temperature requiring output limitation. Output limitation is required at an earlier stage, as the temperature difference becomes smaller. Therefore, from the perspective of protecting all elements from overheating, the starting period of output limitation is preferably determined with reference to the temperature of the element having the smallest temperature difference.

The conventional technology in JP-A-2007-195343 focuses on the highest temperature of the temperatures of the plurality of switching elements. The idea of starting output limitation based on the highest element temperature can be considered correct, should the assumption be made that the output limitation temperature is the same for all of the elements. However, in actuality, various factors for variation in the element temperatures acquired by the control ECU 70 are present. Therefore, it is not appropriate to simply set the output limitation temperatures of all of the elements to the same temperature.

Consequently, it is thought that the concept of setting the output limitation temperatures of all of the elements to a certain temperature as in the conventional technology requires the output limitation temperature to be set with the addition of a safety margin that provides allowance, in order to protect the elements from overheating.

In this regard, according to the present embodiment, focus is placed on the temperature difference of each element. Specifically, the temperature estimating unit 72 estimates the temperature of the element having the smallest temperature difference as a limitation subject temperature, based on the acquired information on the monitored temperature $T_M$ and the arrival determination signals rj. In this way, the temperature estimating unit 72 refers to a functional unit that estimates the temperature of an element having the smallest temperature difference, and does not refer to a unit that estimates the temperature difference itself.

Here, temperatures that can be set as the limitation subject temperature are any of the monitored temperature $T_M$, and learning temperatures $T_{Ga}$ and $T_{Gb}$ of specific elements (non-monitored specific elements) SW-Ga and Gb, described hereafter. Because of the settings of the output limitation temperatures Tlim of the elements, the highest element temperature will not necessarily be the limitation subject temperature.

The output limiting unit 73 starts output limitation of the boost converter 201 when the limitation subject temperature reaches the output limitation temperature Tlim of the element. Consequently, the element temperature can be prevented from rising beyond the heat-resistance temperature and causing element damage.

Next, an example of the output limitation process performed during energization of the boost converter 201 will be described with reference to FIGS. 5 and 6. Changes over time in each element temperature are shown in the upper parts of FIGS. 5 and 6. Determination signals from the arrival determination circuits 50 and the output limiting unit 73 are shown in the lower parts of FIGS. 5 and 6. In the arrival determination circuit 50, when the element temperature of the corresponding general element SW-Ga or Gb reaches the passing temperature $T_{0G}$, the signal from the comparator 52 changes from OFF to ON. In the output limiting unit 73, when the limitation subject temperature reaches the output limitation temperature Tlim set for each element, the output limitation signal changes from OFF to ON.

Figure 5:
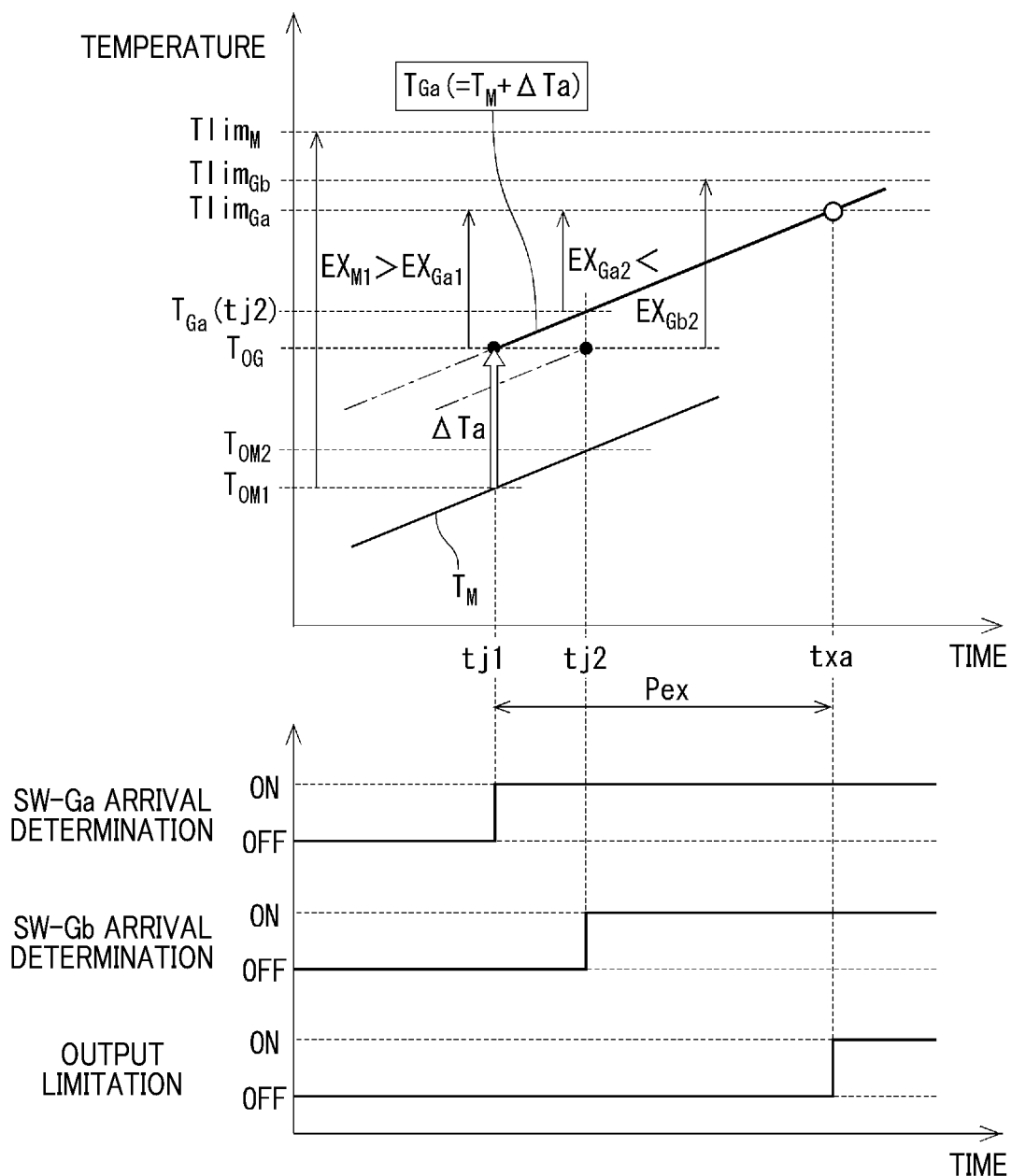
FIG. 5 is a time chart of an example (1) of an output limitation process according to the first embodiment.
Figure 6:
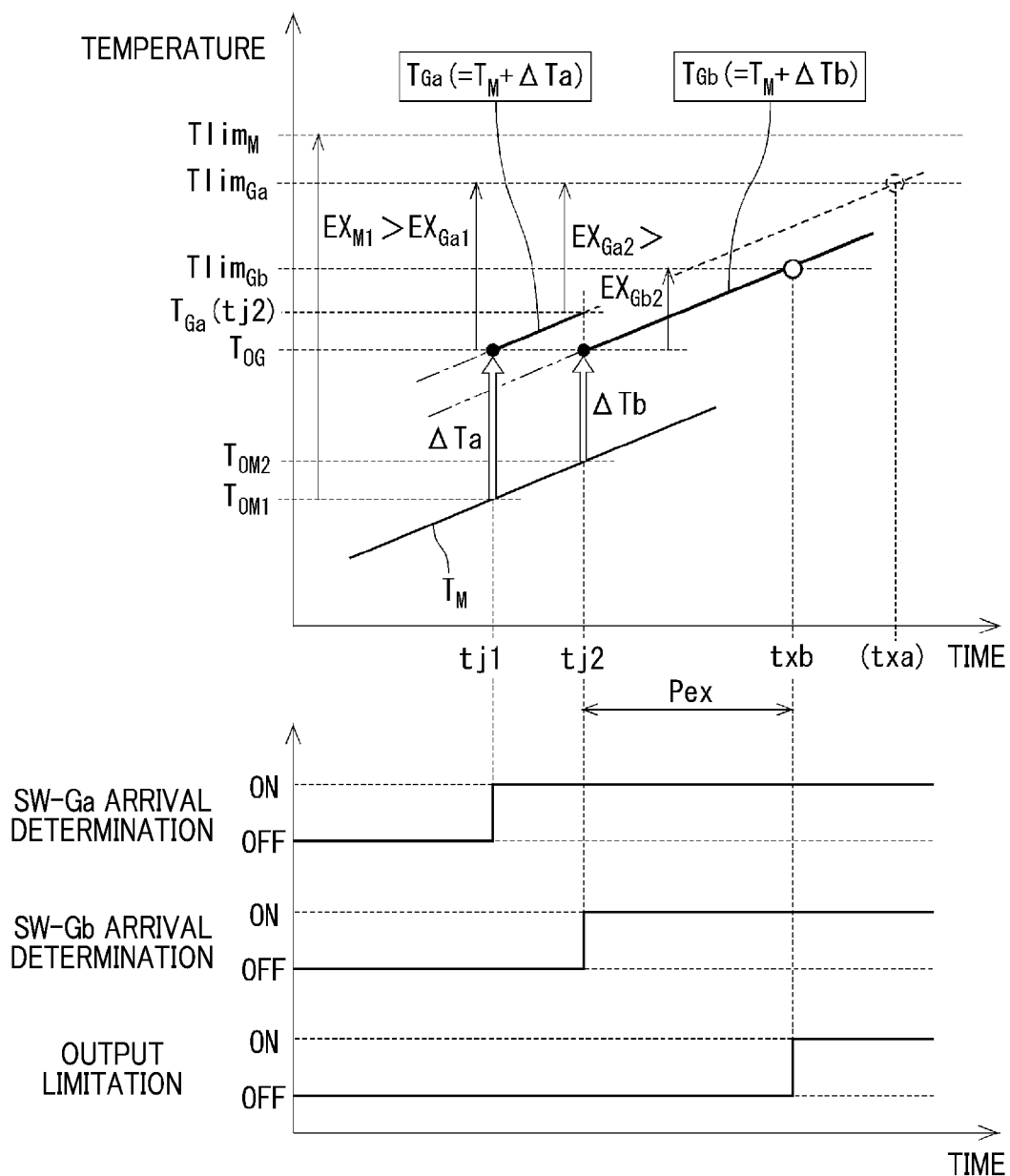
FIG. 6 is a time chart of an example (2) of an output limitation process according to the first embodiment.

The meanings of symbols related to the element temperature that are newly used in FIGS. 5 and 6 are as follows.

Of the symbols described below, tj# collectively denotes tj1, tj2, . . . and indicates a sequence on a time axis. In addition, tj# is also used as the reference number recited within the parentheses in the scope of claims.

$T_{0M\#}$: the monitored temperature $T_M$ at an arrival determination time tj#;

$\Delta Ta$: the difference between the passing temperature $T_{0G}$ and a monitored temperature $T_{0M1}$ at an arrival determination time tj1 of a first specific element SW-Ga ($\Delta Ta = T_{0G} - T_{0M1}$);

$T_{Ga}$: the learning temperature of the first specific element SW-Ga ($T_{Ga} = T_M + \Delta Ta$);

$\Delta Tb$: the difference between the passing temperature $T_{0G}$ and a monitored temperature $T_{0M1}$ at an arrival determination time tj2 of a second specific element SW-Gb ($\Delta Tb = T_{0G} - T_{0M2}$); and $T_{Gb}$: the learning temperature of the second specific element SW-Gb ($T_{Gb} = T_M + \Delta Tb$).

$EX_{M1}$: the temperature difference of the monitored element SW-M at the arrival determination time tj1 of the first specific element SW-Ga ($EX_{M1} = Tlim_M - T_{0M1}$);

$EX_{Ga1}$: the temperature difference of the first specific element SW-Ga at the arrival determination time tj1 of the first specific element SW-Ga ($EX_{Ga1} = Tlim_{Ga} - T_{0G}$);

$EX_{Ga2}$: the temperature difference of the first specific element SW-Ga at the arrival determination time tj2 of the second specific element SW-Gb ($EX_{Ga2} = Tlim_{Ga} - T_{Ga}(tj2)$); and $EX_{Gb2}$: the temperature difference of the second specific element SW-Gb at the arrival determination time tj2 of the second specific element SW-Gb ($EX_{Gb2} = Tlim_{Gb} - T_{0G}$).

As described above, the temperature estimating unit 72 estimates, as the limitation subject temperature, the temperature of the element having the smallest temperature difference among the three switching elements configuring the boost converter 201. The temperature difference is obtained by the current temperature of an element being subtracted from the output limitation temperature Tlim set for each element.

The output limiting unit 73 sets the monitored temperature $T_M$ as the limitation subject temperature in the initial stage of the output limitation process. Then, the limitation subject temperature is not updated if the element having the smallest temperature difference is the monitored element SW-M at all times, until the monitored temperature $T_M$ reaches the output limitation temperature $Tlim_M$. In this case, the general elements SW-Ga and Gb are ultimately not involved in the output limitation process.

Meanwhile, FIGS. 5 and 6 show cases in which the limitation subject temperature is updated in accompaniment with temperature rise in the elements. In both FIGS. 5 and 6, the limitation subject temperature before time tj1 is the monitored temperature $T_M$.

When the element temperature of the general element SW-Ga reaches the passing temperature $T_{0G}$ at time tj1, the temperature estimating unit 72 recognizes the general element SW-Ga as the first specific element. Then, the temperature estimating unit 72 compares the temperature difference $EX_{M1}$ of the monitored element SW-M and the temperature difference $EX_{ga1}$ of the first specific element SW-Ga at the arrival determination time tj1.

Then, because the temperature difference $EX_{Ga1}$ of the first specific element SW-Ga is smaller, the temperature estimating unit 72 estimates a temperature obtained by adding the difference $\Delta Ta$ between the passing temperature ToG and the monitored temperature $T_{0M1}$ at the arrival determination time tj1 to the monitored temperature $T_M$ as the learning temperature $T_{Ga}$ of the first specific element SW-Ga. Then, after time tj1, the learning temperature $T_{Ga}$ of the first specific element SW-Ga is set as the limitation subject temperature.

When the element temperature of the general element SW-Gb reaches the passing temperature $T_{0G}$ at time tj2, the temperature estimating unit 72 recognizes the general element SW-Gb as the second specific element. Then, the temperature estimating unit 72 compares the temperature difference $EX_{Ga2}$ of the first specific element SW-Ga and the temperature difference $EX_{Gb2}$ of the second specific element SW-Gb at the arrival determination time tj2. The determination at this stage differs between the example in FIG. 5 and the example in FIG. 6.

In the example shown in FIG. 5, the temperature difference $EX_{Ga2}$ of the first specific element SW-Ga is smaller. Therefore, the learning temperature $T_{Ga}$ of the first specific element SW-Ga remains set as the limitation subject temperature even after time tj2. Subsequently, when the learning temperature TGa of the first specific element SW-Ga reaches the output limitation temperature $Tlim_{Ga}$ at time txa, the output limiting unit 73 starts output limitation of the boost converter 201. In this case, the period over which the learning temperature $T_{Ga}$ of the first specific element SW-Ga rises from the passing temperature $T_{0G}$ to the output limitation temperature $Tlim_{Ga}$ is a period Pex for delay (extension period or postponement).

Meanwhile, in the example shown in FIG. 6, the temperature difference $EX_{Gb2}$ of the second specific element SW-Gb is smaller. Therefore, the temperature estimating unit 72 estimates a temperature obtained by adding the difference ΔTb between the passing temperature $T_{0G}$ and the monitored temperature $T_{0M2}$ at the arrival determination time tj2 to the monitored temperature $T_M$ as the learning temperature $T_{Gb}$ of the second specific element SW-Gb. Then, after time tj2, the learning temperature $T_{Gb}$ of the second specific element SW-Gb is set as the limitation subject temperature.

Subsequently, when the learning temperature $T_{Gb}$ of the second specific element SW-Gb reaches the output limitation temperature $Tlim_{Gb}$ at time txb, the output limiting unit 73 starts output limitation of the boost converter 201. In this case, the period over which the learning temperature $T_{Gb}$ of the second specific element SW-Gb rises from the passing temperature $T_{0G}$ to the output limitation temperature $Tlim_{Gb}$ is a delay (extension or postponement) peirod Pex.

Here, time txb is earlier than time txa at which the learning temperature $T_{Ga}$ of the first specific element SW-Ga reaches the output limitation temperature $Tlim_{Ga}$. That is, the limitation subject temperature is updated from the learning temperature $T_{Ga}$ of the first specific element SW-Ga to the learning temperature $T_{Gb}$ of the second specific element SW-Gb. Consequently, output limitation can be more appropriately started, taking into consideration the temperature differences of the plurality of general elements SW-Ga and Gb.

Next, the settings of the output limitation temperature $Tlim_M$ of the monitored element SW-M and the output limitation temperature $Tlim_{Ga}$ of the general element SW-Ga, serving as a representative general element, will be described with reference to FIG. 7.

Figure 7:
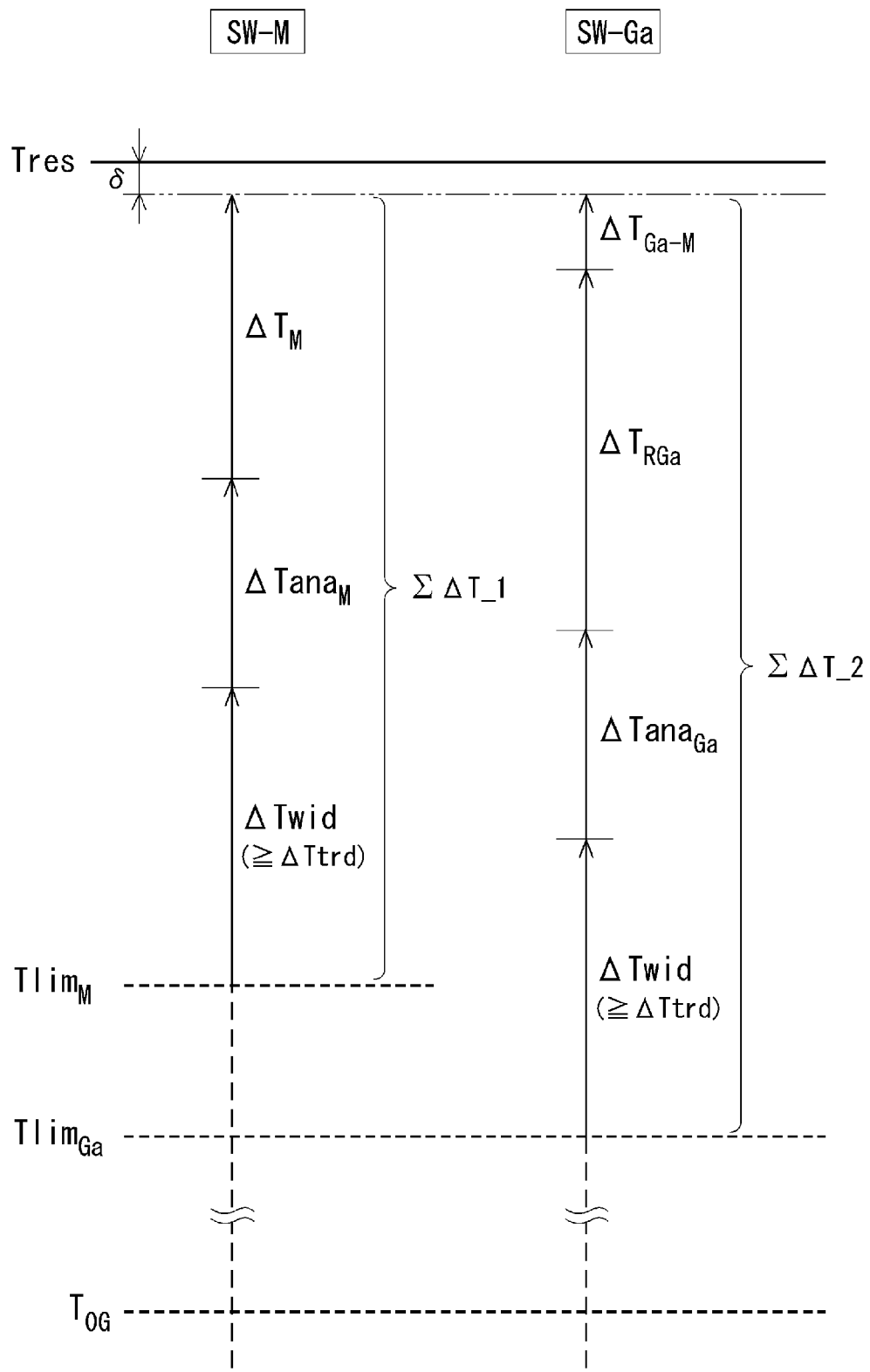
FIG. 7 is a diagram for explaining the setting of an output limitation temperature according to the first embodiment.

The meanings of symbols related to temperature error described in FIG. 7 are as follows.

Tres: element heat-resistance temperature (same among all elements);

$ΔTana_M$: analog output error by the temperature-sensitive diode regarding the monitored element temperature $T_M$;

$ΔTana_{Ga}$: analog output error by the temperature-sensitive diode regarding the general element temperature $T_{Ga}$;

ΔTM: detection error by the monitor circuit 40;

$ΔTR_{Ga}$: detection error by the arrival determination circuit 50;

$ΔT_{Ga-M}$: the difference in heat generation between the specific element and the monitored element during the period from the arrival determination time; and ΔTwid: temperature variation width Regarding each type of temperature error described above, an error that causes the actual temperature of the limitation subject temperature to become higher than the estimated temperature is defined as being in a positive direction. FIG. 7 shows an image in which errors in the positive direction are stacked. The purpose of stacking the errors in the positive direction in this manner is to appropriately set the output limitation temperatures $Tlim_M$ and $Tlim_{Ga}$ so that output limitation is started within a range in which all of the elements are below the heat-resistance temperature in all circumstances. When a negative-direction error occurs, the error may be subtracted from the sum of errors or may be considered to be zero.

Of the symbols described above, the analog output errors $ΔTana_M$ and $ΔTana_{Ga}$, the heat-generation difference $ΔT_{Ga-M}$, and the temperature variation width ΔTwid will be described in detail.

Figure 8A:
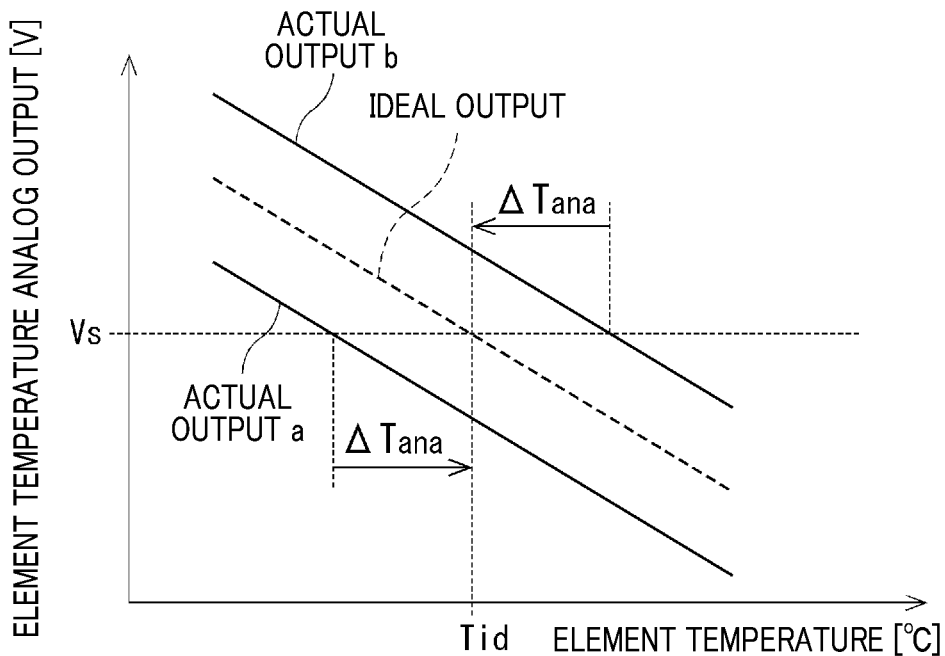
FIGS. 8A and 8B are characteristics diagrams of element temperature analog output error.
Figure 8B:
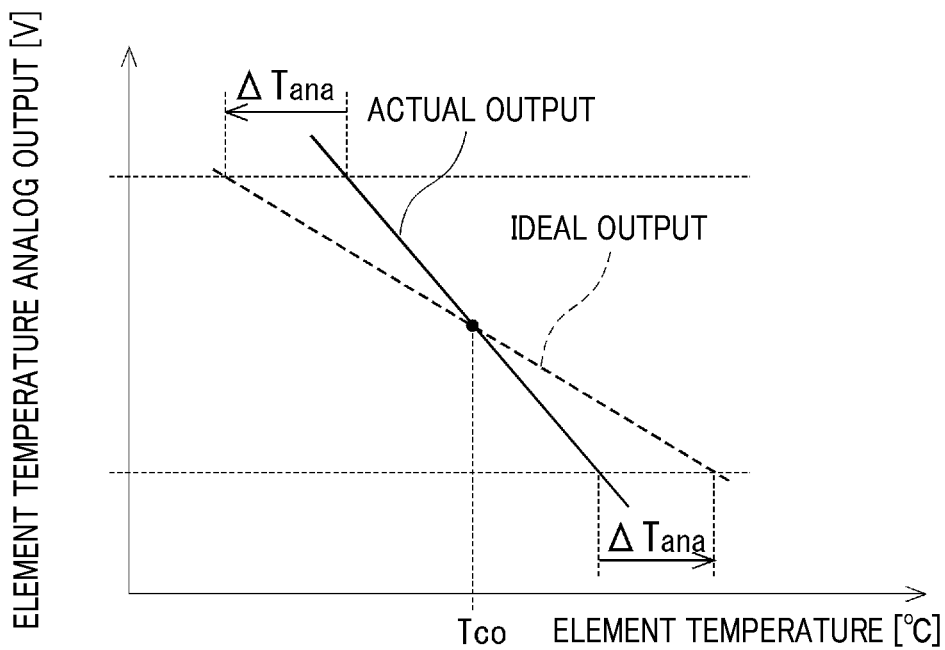

Regarding the analog output characteristics of the temperature-sensitive diode, as shown in FIG. 8A and FIG. 8B, output error is present between the actual output characteristics and the ideal output characteristics. FIG. 8A and FIG. 8B show examples of negative characteristics in which output decreases as the temperature increases. However, whether the characteristics are positive or negative may be set as appropriate.

FIG. 8A shows an example of an offset error in which the slopes are identical and the intercepts differ between the actual output and the ideal output. Actual output a indicates an example in which the actual output is offset further towards the lower side than the ideal output. Actual output b indicates an example in which the actual output is offset further towards the higher side than the ideal output. Under an assumption that the monitor circuit 40 and the arrival determination circuits 50 perform detection based on the ideal output, the true element temperature corresponding to a detected output Vs is offset by a fixed analog output error ΔTana, regardless of the temperature range, in relation to an ideal temperature Tid based on the ideal output characteristics.

FIG. 8B shows an example including gain error in which the slopes differ between the actual output and the ideal output. In this case, the value of the analog output error ΔTana changes depending on the temperature range. When a coinciding temperature Tco at which the actual output and the ideal output coincide is present within an actual usage range, the sign of the analog output error ΔTana is reversed between the higher-temperature side and the lower-temperature side of the coinciding temperature Tco.

Next, to describe the heat-generation difference $ΔT_{Ga-M}$, a case in which the general element SW-Ga has reached the passing temperature $T_{0G}$ and is recognized as the specific element is presumed. The learning temperature TGa of the specific element SW-Ga is estimated under a presumption that loss is equal between the specific element SW-Ga and the monitored element SW-M. Therefore, in FIG. 5 and FIG. 6, the inclining slopes of the learning temperature $T_{Ga}$ and the monitored temperature $T_M$ are shown to be identical. However, in actuality, the heat-generation difference ΔTGa-M based on loss variation between the specific element SW-Ga and the monitored element SW-M may occur during the period Pex from the arrival determination time of the specific element SW-Ga until the learning temperature $T_{Ga}$ reaches the output limitation temperature $Tlim_{Ga}$. When the heat-generation difference $ΔT_{Ga-M}$ is positive, the element temperature of the specific element SW-Ga that is the limitation subject temperature rises at a greater slope than the inclining slope of the monitored temperature $T_M$. When the monitored temperature $T_M$ is the limitation subject temperature, the heat-generation difference $\Delta T_{Ga-M}$ does not need to be taken into consideration.

The temperature variation width $\Delta Twid$ refers to a maximum temperature variation range that may occur in the system in which the power conversion apparatus 10 is being used. As a typical factor in temperature variation, temperature change $\Delta Ttrd$ caused by transient operation of the power conversion circuit due to an external disturbance that is not trackable by output control can be considered. For example, a following situation can be presumed in a system for driving a motor generator of a hybrid car. That is, feedback control is unable to keep up with changes in operation of the motor generator caused by instantaneous changes in state, such as the tires of a traveling vehicle slipping and locking. At this time, the increase in element temperature accompanying the sudden increase in current in the power conversion circuit corresponds to the transient temperature change $\Delta Ttrd$. According to the present embodiments, the output limitation temperatures $Tlim_M$ and $Tlim_{Ga}$ are set, taking into consideration external disturbances such as that described above, as a result of the temperature variation width $\Delta Twid$ being set to a value that is equal to or greater than the transient temperature change $\Delta Ttrd$.

A first group margin $\Sigma\Delta T\_1$ of the monitored element SW-M and a second group margin $\Sigma\Delta T\_2$ of the general element SW-Ga will be defined by expressions (1.1) and (1.2), using the temperature errors described above.

$$\Sigma\Delta T\_1 = \Delta Tana_M + \Delta T_M + \Delta Twid \quad (1.1)$$

$$\Sigma\Delta T\_2 = \Delta Tana_{Ga} + \Delta T_{RGa} + \Delta T_{Ga-M} + \Delta Twid \quad (1.2)$$

For example, the analog output errors of the temperature-sensitive diodes regarding the monitored element temperature $T_M$ and the general element temperature $T_{Ga}$ are $\Delta Tana_M \approx \Delta Tana_{Ga}$. In addition, the detection errors of the monitor circuit 40 and the arrival determination circuit 50 are $\Delta T_M, \Delta T_{RGa}$. In this case, the second group margin $\Sigma\Delta T\_2$ that additionally includes the heat-generation difference $\Delta T_{Ga-M}$ as a factor in temperature error tends to be greater than the first group margin $\Sigma\Delta T\_1$.

Then, the output limitation temperature $Tlim_M$ of the monitored element SW-M and the output limitation temperature $Tlim_{Ga}$ of the general element SW-Ga are set by expressions (2.1) and (2.2).

$$Tlim_M \leq Tres - \Sigma\Delta T\_1 \quad (2.1)$$

$$Tlim_{Ga} \leq Tres - \Sigma\Delta T\_2 \quad (2.2)$$

In FIG. 7, the meaning of ≤ includes the miniscule allowance δ between the cumulative value of the errors and the element heat-resistance temperature Tres. The miniscule allowance δ may be considered to be the same for all elements.

When the second group margin $\Sigma\Delta T\_2$ is greater than the first group margin $\Sigma\Delta T\_1$, the output limitation temperature $Tlim_{Ga}$ of the general element SW-Ga is set to a lower value than the output limitation temperature $TlimM$ of the monitored element SW-M.

In addition, the output limitation temperature $TlimGb$ of the general element SW-Gb is also set based on unique errors similar to those of the general element SW-Ga. In this way, according to the first embodiment, the output limitation temperature Tlim is set for each element based on the loss variations and the like of the temperature-sensitive diodes 34 to 36, the monitor circuit 40, the arrival determination circuit 50, and the switching elements 24 to 26.

The output limiting unit 73 starts output limitation when the limitation subject temperature reaches the output limitation temperature Tlim set for each element. (Effects)

(1) As described above, in the conventional technology in JP-A-2007-195343 in which the highest element temperature of a plurality of switching elements is estimated, variations in temperature resulting from analog output errors by the temperature-sensitive diodes of the elements, detection errors in the circuits, and the like are not taken into consideration. Therefore, from the perspective of reliably protecting the elements from overheating, the output limitation temperature is required to be set with the addition of a safety margin that provides allowance taking into account the entirety of the various factors for variation. Consequently, excessive output limitations tend to be applied. Element performance cannot be effectively realized. As a result, the overall apparatus may become larger in size due to higher-specification switching elements and larger circuit scale.

In this regard, according to the present embodiments, the temperature estimating unit 72 of the control ECU 701 estimates, as the limitation subject temperature, the temperature of the element having the smallest temperature difference $EX_M$ or $EX_{G*}$. The temperature difference temperature $EX_M$ or $EX_{G*}$ s obtained by the current temperature of an element being subtracted from the output limitation temperature $Tlim_M$ or $Tlim_{G*}$ set for each element. In addition, the output limiting unit 73 starts output limitation of the power conversion circuit when the limitation subject temperature reaches the output limitation temperature Tlim of the element.

When the temperature difference $EX_{G*}$ of the specific element SW-G* at the arrival determination time tj is smaller than the temperature difference $EX_M$ of the monitored element SW-M, the temperature estimating unit 72 estimates a temperature obtained by adding the difference $\Delta T*$ between the passing temperature $T_{0G}$ and the monitored temperature $T_{0M}$ at the arrival determination time to the monitored temperature $T_M$ as the learning temperature $T_{G*}$ of the specific element SW-G*. The output limiting unit 73 determines the application of output limitation with the monitored temperature $T_M$ as the limitation subject temperature until the arrival determination time, and the learning temperature $T_{G*}$ of the specific element SW-G* as the limitation subject temperature after the arrival determination time.

According to the present embodiments, the output limitation temperature Tlim is set taking into consideration temperature variations in each element. In addition, the application of output limitation is determined with focus on the temperature of the element having the smallest temperature difference that is the difference between the current temperature of an element and the output limitation temperature Tlim.

As a result, the safety margin set to absorb variations can be reduced. The output limitation temperature Tlim can be set as high as possible. As a result, excessive application of output limitation can be suppressed and element performance can be effectively realized. Consequently, use of switching elements having higher specifications is avoided and contribution is made to size reduction of the overall apparatus. Alternatively, when the output limitation temperature Tlim is not set to a high temperature, product quality can be improved.

(2) In the configuration in which two general elements SW-Ga and Gb are used, a following situation is supposed.

The first general element SW-Ga reaches the passing temperature $T_{OG}$ at the first arrival determination time tj1 and is recognized as the first specific element. Subsequently, the second general element SW-Gb reaches the passing temperature $T_{OG}$ and is recognized as the second specific element at the second arrival determination time tj2 before the learning temperature $T_{Ga}$ of the first specific element SW-Ga reaches the output limitation temperature $Tlim_{Ga}$.

At this time, the output limiting unit 73 determines the application of output limitation with the learning temperature of the specific element having the smaller temperature difference at the second arrival determination time as the limitation subject temperature.

As a result, output limitation can be more appropriately started, based on the comparison between the temperature differences of the plurality of general elements SW-Ga and Gb. Consequently, in the setting of the output limitation temperature Tlim, the safety margin for absorbing variations can be further reduced and the output limitation temperature Tlim can be set to a higher temperature.

The concept of a first general element and a second general element in the claims is not limited to cases in which two general elements are provided, and are also applicable to cases in which three or more general elements are provided. That is, based on a generalized interpretation, of two general elements SW-G* that reach the passing temperature $T_{OG}$ before and after each other in terms of time, the element that arrives earlier is referred to as the first general element and the element that arrives later is referred to as the second general element. Subsequently, when a third element also reaches the passing temperature $T_{OG}$, the second element that had initially been referred to as the second general element is now the first general element and the third element is the new second general element. In this way, for all general elements SW-G* that reach the passing temperature $T_{OG}$ before any of the elements reaches the output limitation temperature Tlim, a comparison of temperature difference is performed with the element that has just previously reached the passing temperature $T_{OG}$. Then, the determination is made regarding the element of which the learning temperature is to be set as the output limitation temperature.

(3) The output limitation temperature $Tlim_M$ of the monitored element SW-M and the output limitation temperature TlimG* of the general element SW-G* are set such as to be equal to or less than a temperature obtained by the respective first group margin $\Sigma\Delta T\_1$ and second group margin $\Sigma\Delta T\_2$ being subtracted from the heat-resistance temperature Tres of the switching elements.

The first group margin $\Sigma\Delta T\_1$ is the sum of the analog output error $\Delta Tana_M$ of the temperature-sensitive diode 35, the detection error $\Delta T_M$ of the monitor circuit 40, and the temperature variation width $\Delta$Twid. The second group margin $\Sigma\Delta T\_2$ is the sum of the analog output error $\Delta Tana_{G*}$ of the temperature-sensitive diode 34 or 36, the detection error $\Delta T_{RG*}$ of the arrival determination circuit 50, the heat-generation difference $\Delta T_{G*-M}$ that occurs based on the loss variation between the specific element SW-G* and the monitored element SW-M during the period for delay, and the temperature variation width $\Delta$Twid. The temperature variation width $\Delta$Twid is set to a value that is equal to or greater than the temperature change $\Delta$Ttrd caused by transient operation of the power conversion circuit due to an external disturbance that is not trackable by output control.

In this way, the factors for temperature variation actually occurring in the system in which the power conversion apparatus 101 is used are specified in detail. Consequently, a process that is suitable for an actual situation can be performed.

Second Embodiment

Next, a configuration of the control ECU 702 according to the second embodiment and the difference with the output limitation process according to the first embodiment will be described with reference to FIGS. 9 to 12. FIGS. 9, 10A, 10B, and 12 respectively correspond to FIGS. 4, 8A, 8B, and 7 according to the first embodiment. In addition, FIG. 11 is a time chart of a format similar to that of FIGS. 5 and 6 according to the first embodiment.

Figure 9:
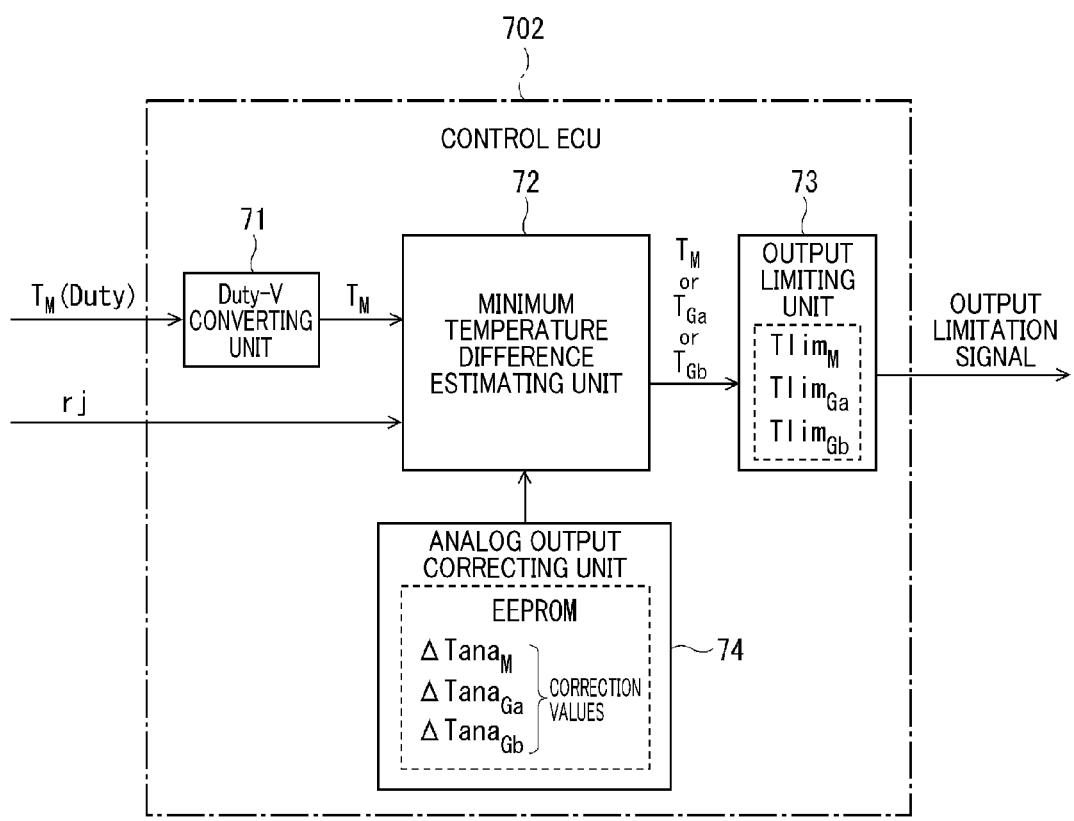
FIG. 9 is a control block diagram of a control ECU according to the second embodiment.

As shown in FIG. 9, in the control ECU 702 according to the second embodiment, an analog output correcting unit 74 is further provided in the control ECU 701 according to the first embodiment. The analog output correcting unit 74 corrects the analog output errors $\Delta Tana_{Ga}$, $\Delta Tana_M$, and $\Delta Tana_{Gb}$ of the temperature-sensitive diodes 34, 35, and 36.

The analog output correcting unit 74 stores predetermined correction values of the analog output errors $\Delta Tana_{Ga}$, $\Delta Tana_M$, and $\Delta Tana_{Gb}$ for each individual temperature-sensitive diode in a non-volatile memory, such as an electrically erasable programmable read-only memory (EEPROM).

During actual manufacturing of a product, for example, a method can be considered in which the correction values are written in a Quick Response (QR) code (registered trademark) of a semiconductor module in which the switching element and the temperature-sensitive diode are modularized. Then, when the semiconductor module is assembled to the power conversion circuit board, the correction value is written in a non-volatile memory on the board. As a result, the analog output correcting unit 74 can correct the analog output errors with a simple configuration.

Figure 10A:
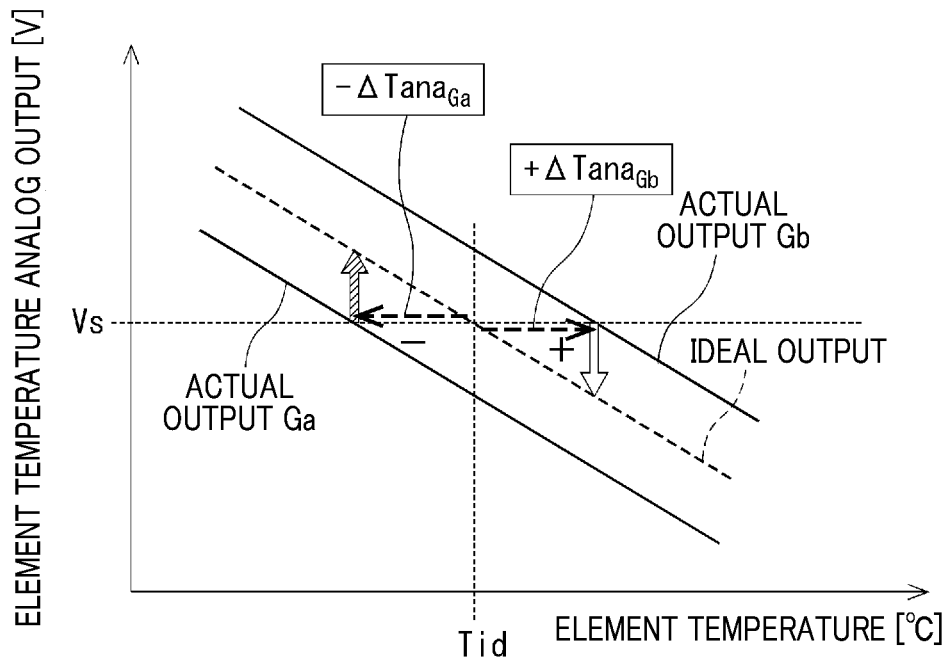
FIGS. 10A and 10B are characteristics diagrams of the correction of element temperature analog output error according to the second embodiment.
Figure 10B:
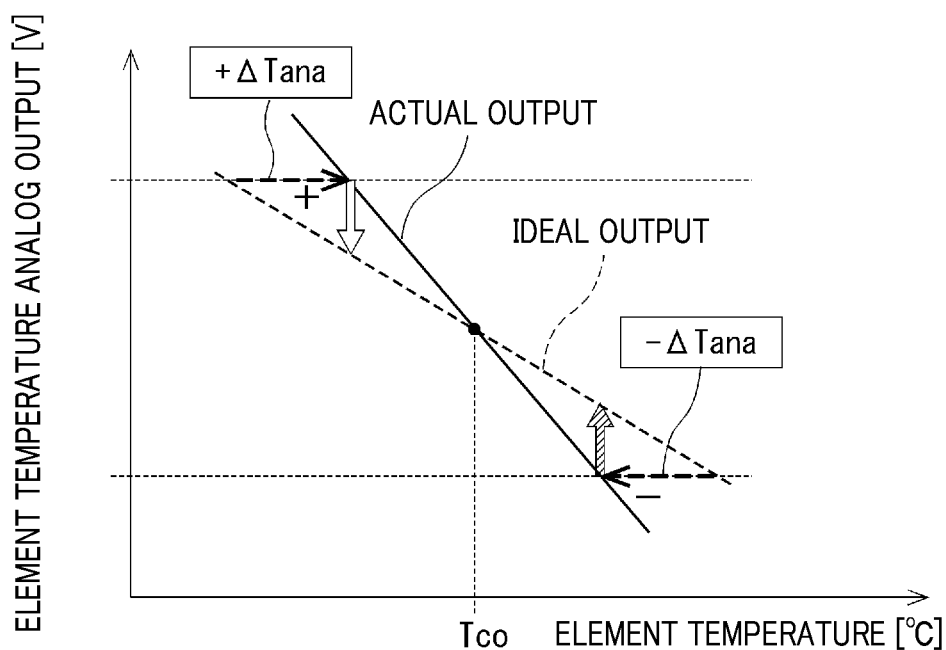
Figure 11:
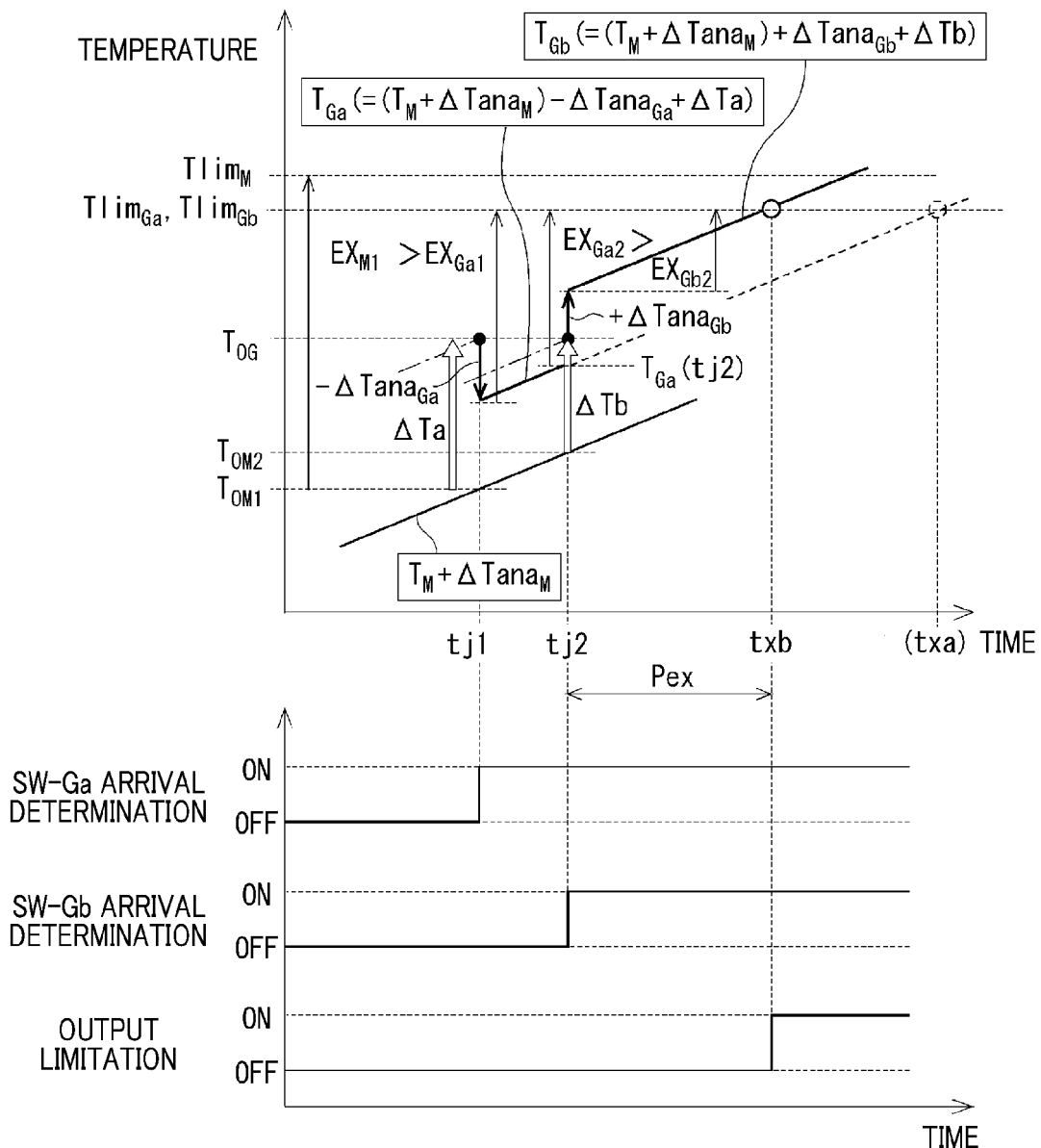
FIG. 11 is a time chart of an example of an output limitation process according to the second embodiment.

FIGS. 10A and 10B conceptually show the correction of analog output errors.

In the examples of an offset error shown in FIG. 10A, when an actual output Ga is offset further towards the lower side than the ideal output, the analog output correcting unit 74 increases the actual output Ga so as to coincide with the ideal output. As a result, the analog output error $\Delta Tana_{Ga}$ is subtracted from the detected temperature.

In addition, when an actual output Gb is offset further towards the higher side than the ideal output, the analog output correcting unit 74 reduce the actual output Gb so as to coincide with the ideal output. As a result, the analog output error $\Delta Tana_{Gb}$ is added to the detected temperature.

FIG. 10B shows an example including gain error in which the absolute value of the slope of the actual output is greater than that of the slope of the ideal output. In this case, the analog output correcting unit 74 performs correction so as to reduce the actual output on the lower-temperature side of the coinciding temperature Tco and increase the actual output on the higher-temperature side of the coinciding temperature Tco, depending on the temperature.

In the above-described manner, the analog output correcting unit 74 corrects the analog output error $\Delta Tana_M$ in the input monitored temperature $T_M$ of the monitored element SW-M. In addition, the analog output correcting unit 74 offsets the learning temperature $T_{G*}$ by the analog output error $\Delta Tana_{G*}$ for the specific element SW-G* determined to have reached the passing temperature $T_{OG}$.

The temperature estimating unit 72 estimates the temperature of the element having the smallest temperature difference as the limitation subject temperature, based on the monitored temperature $T_M$ and the learning temperature $T_{G*}$ of the specific element SW-G* corrected by the analog output correcting unit 74.

A specific example of the output limitation process according to the second embodiment will be described with reference to FIG. 11. In a manner similar to FIG. 6 according to the first embodiment, FIG. 11 shows a case in which the limitation subject temperature is updated from the monitored temperature $T_M$ to the learning temperature $T_{Ga}$ of the first specific element SW-Ga and is further updated to the learning temperature $T_{Gb}$ of the second specific element SW-Gb. Here, the actual output characteristics of the specific elements SW-Ga and Gb are considered to be the characteristics, actual output Ga and actual output Gb, shown in FIG. 10A.

The temperature of the monitored element SW-M serving as reference for the learning temperatures $T_{Ga}$ and $T_{Gb}$ in FIG. 11 is expressed as a temperature obtained by the analog output error $\Delta Tana_M$ being corrected in the monitored temperature $T_M$ detected by the monitor circuit 40 (that is, $T_M + \Delta Tana_M$). It is presumed that the analog output error $\Delta Tana_M$ is also an offset error in which the slope is identical to that of the ideal output characteristics.

At time tj1, the element temperature of the general element SW-Ga reaches the passing temperature $T_{0G}$, and the general element SW-Ga is recognized as the first specific element SW-Ga. At this time, a correction is performed in which the analog output error $\Delta Tana_{Ga}$ is subtracted from the passing temperature $T_{0G}$ determined to be reached by the arrival determining circuit 50. Then, the temperature difference $EX_{Ga1}$ of the first specific element SW-Ga calculated based on the corrected passing temperature $T_{0G}$ is determined to be smaller than the temperature difference $EX_{M1}$ of the monitored element SW-M. Then, the temperature estimating unit 72 estimates the learning temperature $T_{Ga}$ of the first specific element SW-Ga by an expression (3.1).

$$T_{Ga} = (T_M + \Delta Tana_M) - \Delta Tana_{Ga} + \Delta Ta \quad (3.1)$$

After time tj1, the learning temperature $T_{Ga}$ of the first specific element SW-Ga is set as the limitation subject temperature.

Next, at time tj2, the element temperature of the general element SW-Gb reaches the passing temperature $T_{0G}$ and the general element SW-Gb is recognized as the second specific element SW-Gb. At this time, a correction is performed in which the analog output error $\Delta Tana_{Gb}$ is added to the passing temperature $T_{0G}$ determined to be reached by the arrival determination circuit 50. Then, the temperature difference $EX_{Gb2}$ of the second specific element SW-Gb calculated based on the corrected passing temperature $T_{0G}$ is determined to be smaller than the temperature difference $EX_{Ga2}$ of the first specific element SW-Ga at the arrival determination time tj2. Then, the temperature estimating unit 72 estimates the learning temperature $T_{Gb}$ of the second specific element SW-Gb using expression (3.2).

$$T_{Gb} = (T_M + \Delta Tana_M) - \Delta Tana_{Gb} + \Delta Tb \quad (3.2)$$

After time tj2, the learning temperature $T_{Gb}$ of the second specific element SW-Gb is set as the limitation subject temperature.

Subsequently, when the learning temperature $T_{Gb}$ of the second specific element SW-Gb reaches the output limitation temperature TlimGb at time txb, the output limiting unit 73 starts output limitation of the boost converter 201.

In a manner similar to that in FIG. 6, in FIG. 11 as well, time txb is earlier than time txa at which the learning temperature $T_{Ga}$ of the first specific element SW-Ga reaches the output limitation temperature $Tlim_{Ga}$. That is, the limitation subject temperature is updated from the learning temperature $T_{Ga}$ of the first specific element SW-Ga to the learning temperature $T_{Gb}$ of the second specific element SW-Gb. Consequently, output limitation can be more appropriately started, taking into consideration the temperature differences of the plurality of general elements SW-Ga and Gb.

In this way, according to the second embodiment, the analog output correcting unit 74 corrects the analog output errors $\Delta Tana_M$, $\Delta Tana_{Ga}$, and $\Delta Tana_{Gb}$ of the temperature-sensitive diodes.

Figure 12:
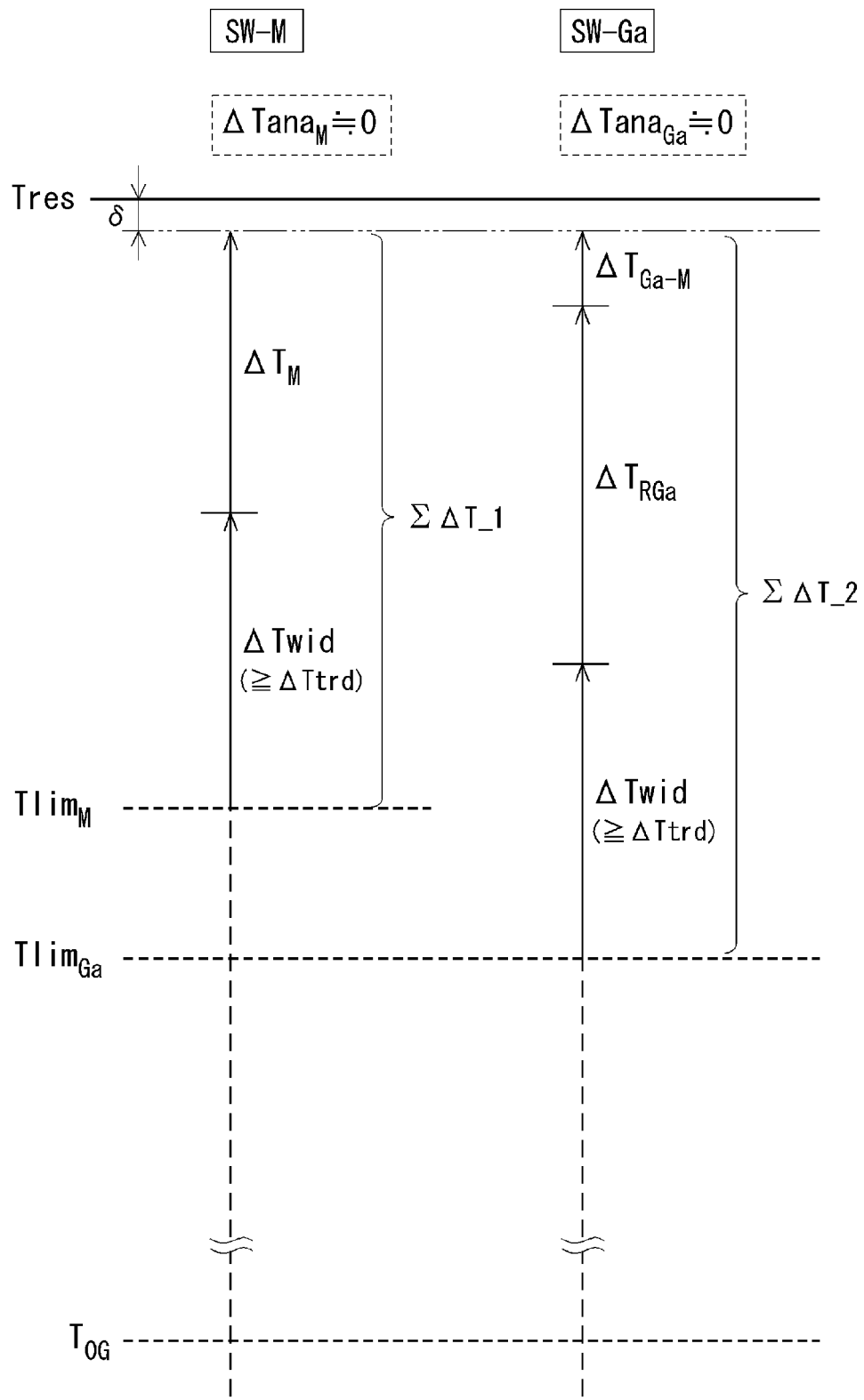
FIG. 12 is a diagram for explaining the setting of an output limitation temperature according to the second embodiment.

As a result, as shown in FIG. 12, the analog output error $\Delta Tana_M$ in the first group margin $\Sigma \Delta T\_1$ and the analog output error $\Delta Tana_{G*}$ in the second group margin $\Sigma \Delta T\_2$ can be considered to be zero. Therefore, the output limitation temperatures $Tlim_M$ and $Tlim_{Ga}$ can be set to temperatures higher than those in FIG. 7 according to the first embodiment. Element performance can be more effectively realized.

In addition, because variation in the analog output errors $\Delta Tana_{Ga}$ and $\Delta Tana_{Gb}$ is removed from the second group margin $\Sigma \Delta T\_2$, the factors for variation in the output limitation temperatures $Tlim_{Ga}$ and $Tlim_{Gb}$ of the general elements SW-Ga and SW-Gb are reduced. Therefore, in FIG. 11, the output limitation temperatures $Tlim_{Ga}$ and $Tlim_{Gb}$ of the general elements SW-Ga and SW-Gb are shown to be the same temperature.

Third Embodiment

Figure 13:
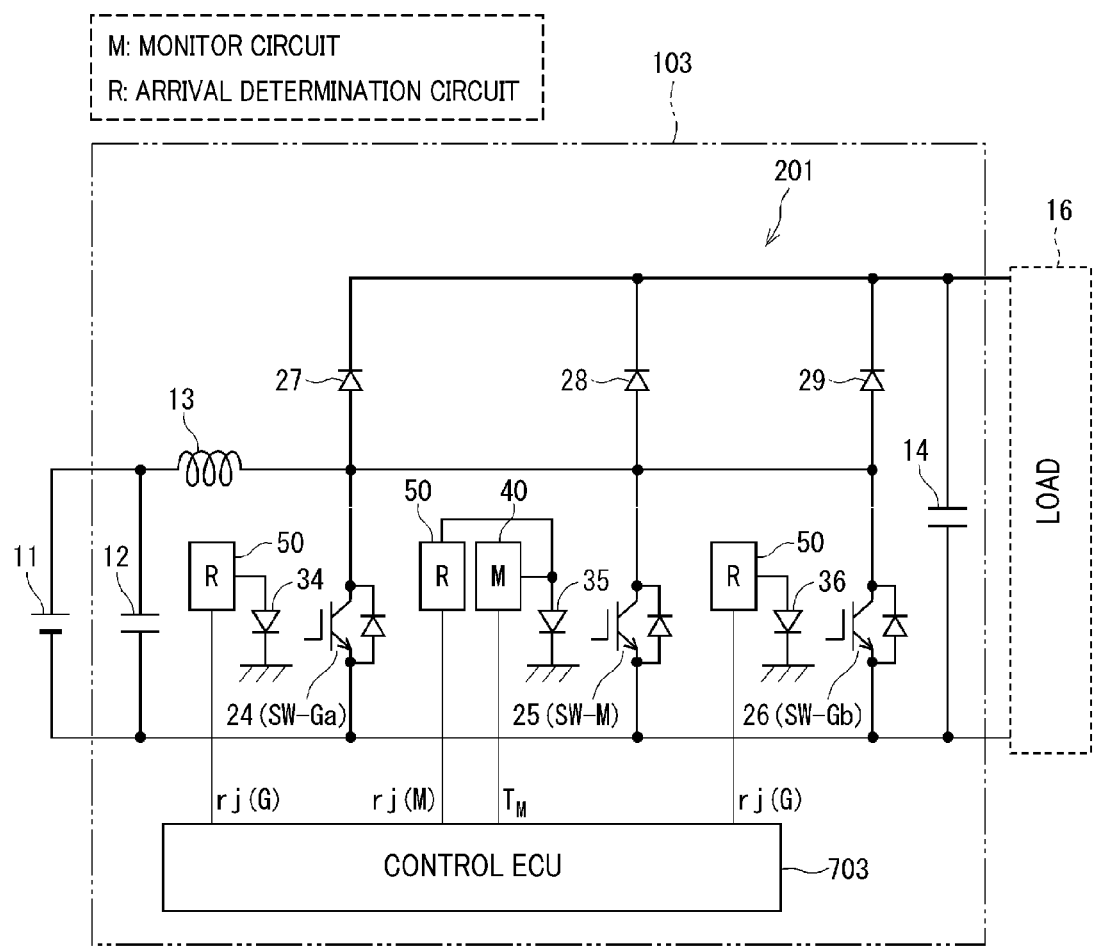
FIG. 13 is an overall configuration diagram of a power conversion apparatus according to a third embodiment.
Figure 15:
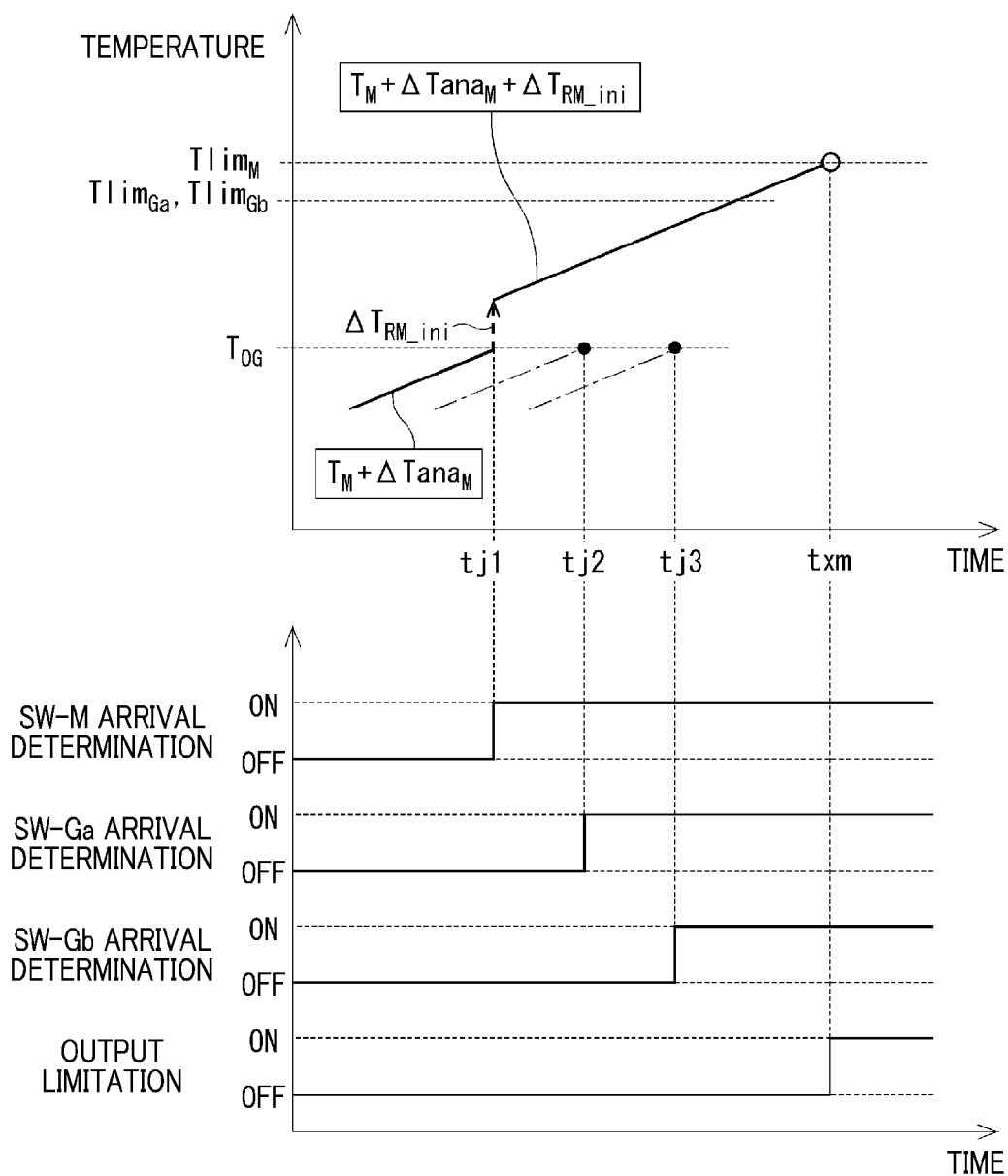
FIG. 15 is a time chart of an example of an output limitation process according to the third embodiment.
Figure 16:
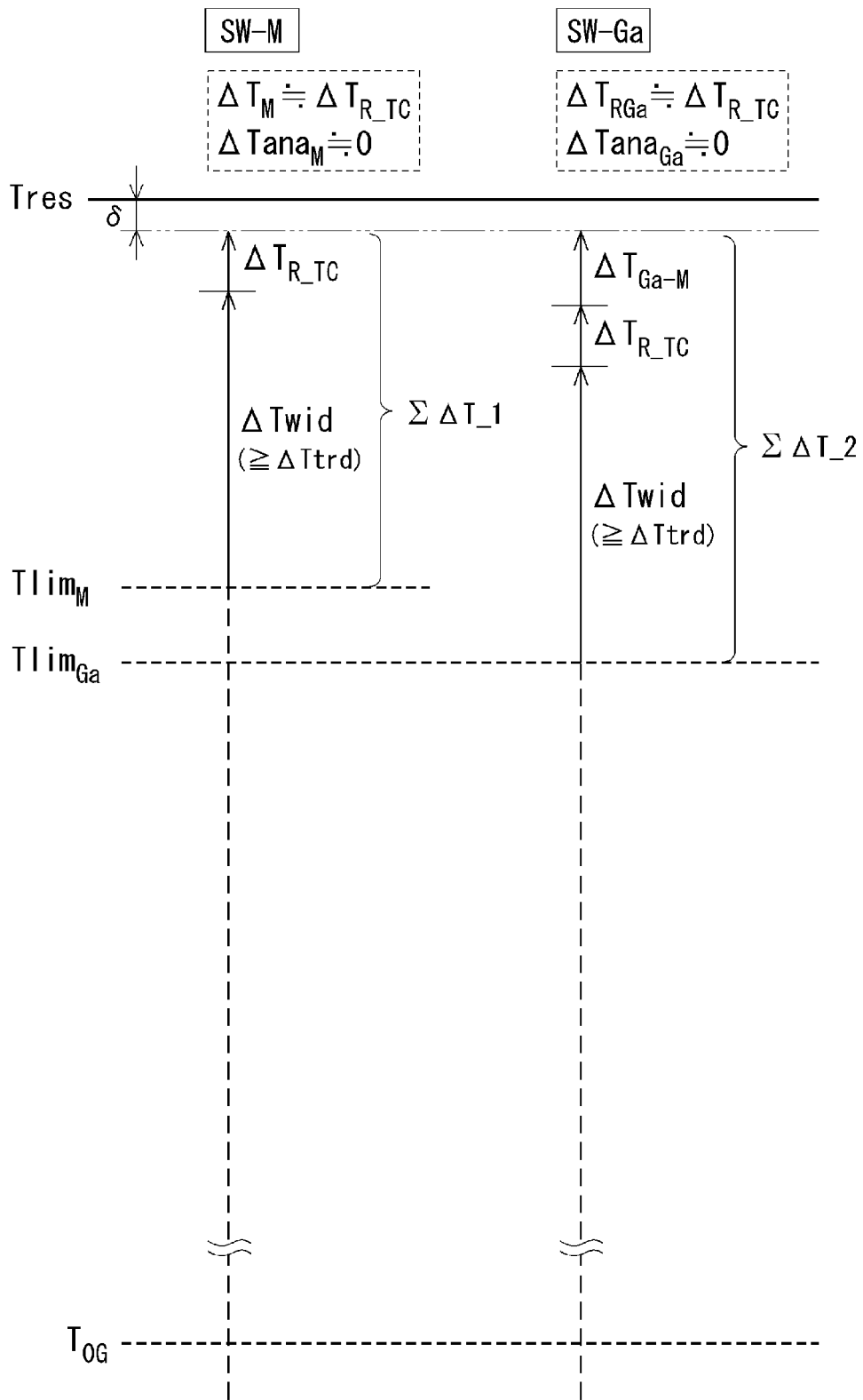
FIG. 16 is a diagram for explaining the setting of an output limitation temperature according to the third embodiment.

Next, configurations of a power conversion apparatus 103 and a control ECU 703, and the like according to a third embodiment will be described with reference to FIGS. 13 to 16. FIG. 13 corresponds to FIG. 1 according to the first and second embodiments. FIG. 13 shows the configuration of the power conversion apparatus 103 that includes the boost converter 201 as the power conversion circuit. FIG. 15 is a time chart of a format similar to that of FIGS. 5, 6, and 11. FIG. 16 corresponds to FIGS. 7 and 12.

As shown in FIG. 13, in the power conversion apparatus 103 according to the third embodiment, both the monitor circuit 40 and the arrival determination circuit 50 are provided in correspondence to the switching element 25 that is the monitored element SW-M. That is, three arrival determination circuits 50 are provided for the three switching elements 24, 25, and 26.

The arrival determination circuit 50 for the monitored element SW-M outputs the arrival determination signal when the monitored element SW-M reaches the passing temperature $T_{0G}$. In FIG. 13, the arrival determination signal outputted by the arrival determination circuit 50 for the monitored element SW-M is denoted by rj(M). The arrival determination signals outputted by the arrival determination circuits 50 for the general elements SW-Ga and SW-Gb are denoted by rj(G).

Figure 14:
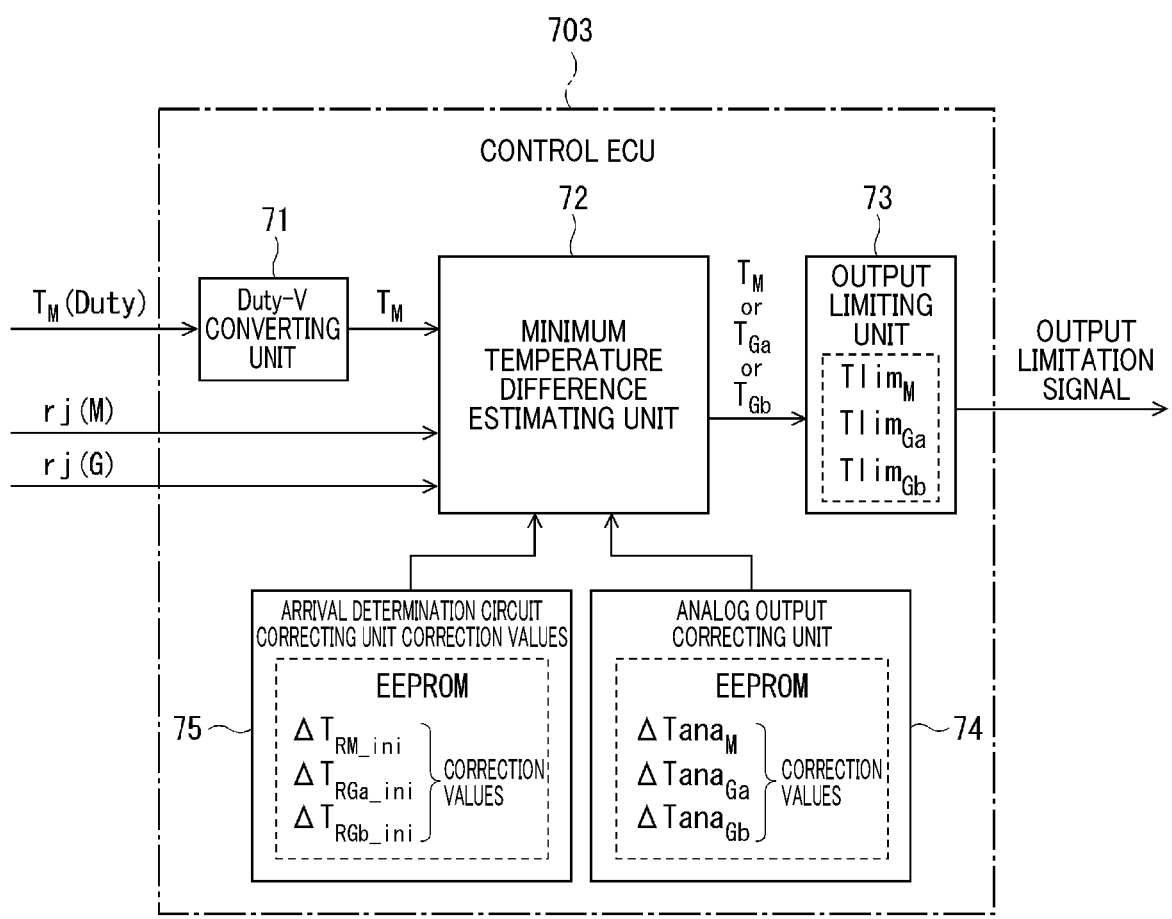
FIG. 14 is a control block diagram of a control ECU according to the third embodiment.

As shown in FIG. 14, the control ECU 703 according to the third embodiment further includes, in addition to the analog output correcting unit 74, an arrival determination circuit correcting unit 75. The arrival determination circuit correcting unit 75 corrects initial detection errors $\Delta T_{RM\_ini}$, $\Delta T_{RGa\_ini}$ on, and $\Delta T_{RGb\_ini}$ of the arrival determination circuits 50.

The arrival determination circuit correcting unit 75 stores the correction values of the predetermined initial detection errors $\Delta T_{RM\_ini}$, $\Delta T_{RGa\_ini}$, and $\Delta T_{RGb\_ini}$ for each individual arrival determination circuit 50 in a non-volatile memory, such as an EEPROM.

The correction values of the initial detection errors $\Delta T_{RM\_ini}$, $\Delta T_{RGa\_ini}$, and $\Delta T_{RGb\_ini}$ are set, for example, based on the difference between output characteristics at a reference temperature during manufacturing and ideal output characteristics. In addition, for example, the correction values can be written to the non-volatile memory by a method similar to that of the analog output correcting unit 74. As a result, the arrival determination circuit correcting unit 75 can correct the initial detection errors with a simple configuration.

When the arrival determination signals rj(M) and rj(G) are acquired from the arrival determination circuits 50, the temperature estimating unit 72 estimates the limitation subject temperature based on temperatures in which the initial detection errors $\Delta T_{RM\_ini}$, $\Delta T_{RGa\_ini}$, and $\Delta T_{RGb\_ini}$ are corrected by the arrival determination circuit correcting unit 75.

For example, when the general element SW-Ga is determined to have reached the passing temperature $T_{0G}$, the temperature of the general element SW-Ga at the arrival determination time is corrected to $T_{0G}+\Delta T_{RGa\_ini}$.

In addition, when the monitored element SW-M is determined to have reached the passing temperature $T_{0G}$, the temperature of the monitored element SW-M at the arrival determination time is corrected to $T_{0G}+\Delta T_{RM\_ini}$. The monitored temperature $T_M$ detected by the monitor circuit 40 after the arrival determination time is corrected based on this post-correction temperature.

FIG. 15 shows an example of the output limitation process when the element having the smallest temperature difference is the monitored element SW-M at all times, according to the third embodiment. In a manner similar to that in FIG. 11, the monitored temperature $T_M$ in which the analog output error $\Delta Tana_M$ is corrected (that is, $T_M+\Delta Tana_M$) is set as the limitation subject temperature before time tj1.

When the monitored temperature $T_M+\Delta Tana_M$ reaches the passing temperature $T_{0G}$ at time tj1, the arrival determination circuit correcting unit 75 corrects the initial detection error $\Delta T_{RM\_ini}$ of the arrival determination circuit 50 for the monitored element SW-M in the monitored temperature $T_M+\Delta Tana_M$ at time tj1. As a result, $T_M+\Delta Tana_M+\Delta T_{RM\_ini}$ is set as the limitation subject temperature after time tj1.

Subsequently, when the post-correction monitored temperature $T_M+\Delta Tana_M+\Delta T_{RM\_ini}$ reaches the output limitation temperature $Tlim_M$ at time txm, the output limiting unit 73 starts output limitation of the boost converter 201. At times tj2 and tj3 between time tj1 and time txm, the element temperatures of the general elements SW-Ga and SW-Gb reach the passing temperature $T_{0G}$. However, the temperature differences of the general elements SW-Ga and SW-Gb at the arrival determination times tj2 and tj3 are both greater than the temperature difference of the monitored element SW-M (not shown). Therefore, the limitation subject temperature is not updated.

As a result, the start timing of output limitation particularly when the monitored temperature $T_M$ is the limitation subject temperature can be appropriately determined.

In this way, in the control ECU 703, the arrival determination circuit correcting unit 75 corrects the initial detection errors $\Delta T_{RM\_ini}$, $\Delta T_{RGa\_ini}$, and $\Delta T_{RGb\_ini}$ of the arrival determination circuits 50 for the monitored element SW-M and the general elements SW-Ga and SW-Gb.

However, a temperature characteristics deterioration error $\Delta T_{R\_TC}$ may occur. The temperature characteristics deterioration error $\Delta T_{R\_TC}$ is an error based on the effects on temperature characteristics caused by a temperature difference from a reference temperature in which the initial detection error is set or an error based on deterioration of the arrival determination circuit 50 after the initial stage. That is, it is thought that the temperature characteristics deterioration error $\Delta T_{R\_TC}$ alone may remain even after correction by the arrival determination circuit correcting unit 75.

Therefore, the control ECU 70 prescribes detection errors $\Delta T_{RM}$, $\Delta T_{RGa}$, and $\Delta T_{RGb}$ of the arrival determination circuits 50 based only on the temperature characteristics deterioration error $\Delta T_{R\_TC}$. When the effects on the temperature characteristics caused by temperature difference with the reference temperature or the extent of deterioration is small, the temperature characteristics deterioration error $\Delta T_{R\_TC}$ may be ignored. The detection errors $\Delta T_{RM}$, $\Delta T_{RGa}$, and $\Delta T_{RGb}$ of the arrival determination circuits 50 may be considered to be zero.

In FIG. 16, the temperature characteristics deterioration errors $\Delta T_{R\_TC}$ of the arrival determination circuits 50 are assumed to be the same.

As shown in FIG. 16, regarding the first group margin $\Sigma\Delta T\_1$ of the monitored element SW-M, the detection error $\Delta T_{RM}$ of the monitor circuit 40 is prescribed by only the temperature characteristics deterioration error $\Delta T_{R\_TC}$ of the arrival determination circuit 50 for the monitored element SW-M. In addition, regarding the second group margin $\Sigma\Delta T\_2$ of the general element SW-Ga, the detection error $\Delta T_{RGa}$ of the arrival determination circuit 50 is prescribed by only the temperature characteristics deterioration error $\Delta T_{R\_TC}$. Therefore, the output limitation temperatures $Tlim_M$ and $Tlim_{Ga}$ can be set to temperatures higher than those in FIG. 7 according to the first embodiment and FIG. 12 according to the second embodiment. Element performance can be more effectively realized.

According to the above-described embodiment, the arrival determination circuits 50 for the monitored element SW-M and for the general elements SW-Ga and SW-Gb are all subjected to correction by the arrival determination circuit correcting unit 75. As another variation example according to the third embodiment, only the arrival determination circuit 50 for the monitored element SW-M, or only the arrival determination circuit 50 for at least one of the general elements SW-Ga and SW-Gb may be subjected to correction by the arrival determination circuit correcting unit 75. In addition, the control ECU may not include the analog output correcting unit 74, and may only include the arrival determination circuit correcting unit 75.

Fourth and Fifth Embodiments

Next, a power conversion apparatus according to fourth and fifth embodiments will be described with reference to FIGS. 17 and 18. The power conversion apparatus according to the fourth and fifth embodiments differs from those according to the first to third embodiments in terms of the configuration of the power conversion circuit and the numbers of monitored elements SW-M and general elements SW-G*.

Figure 17:
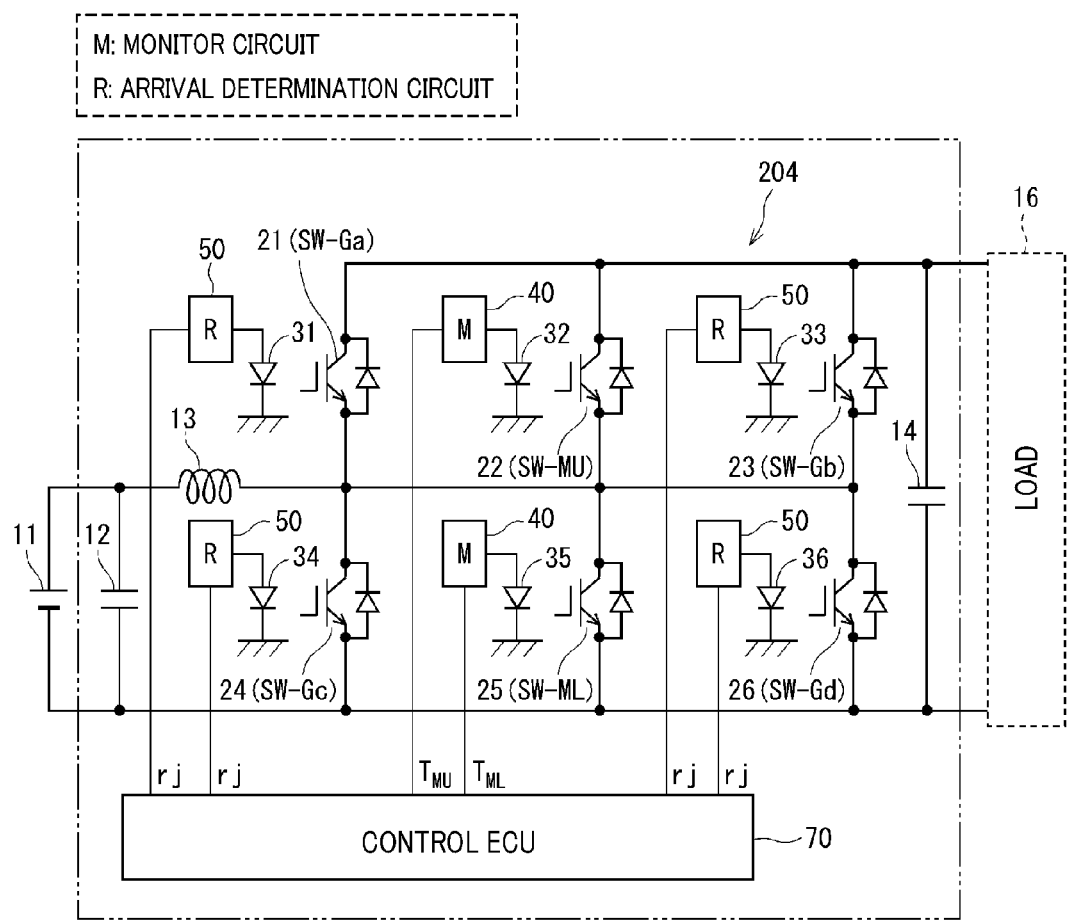
FIG. 17 is a schematic diagram of a power conversion apparatus according to a fourth embodiment.
Figure 18:
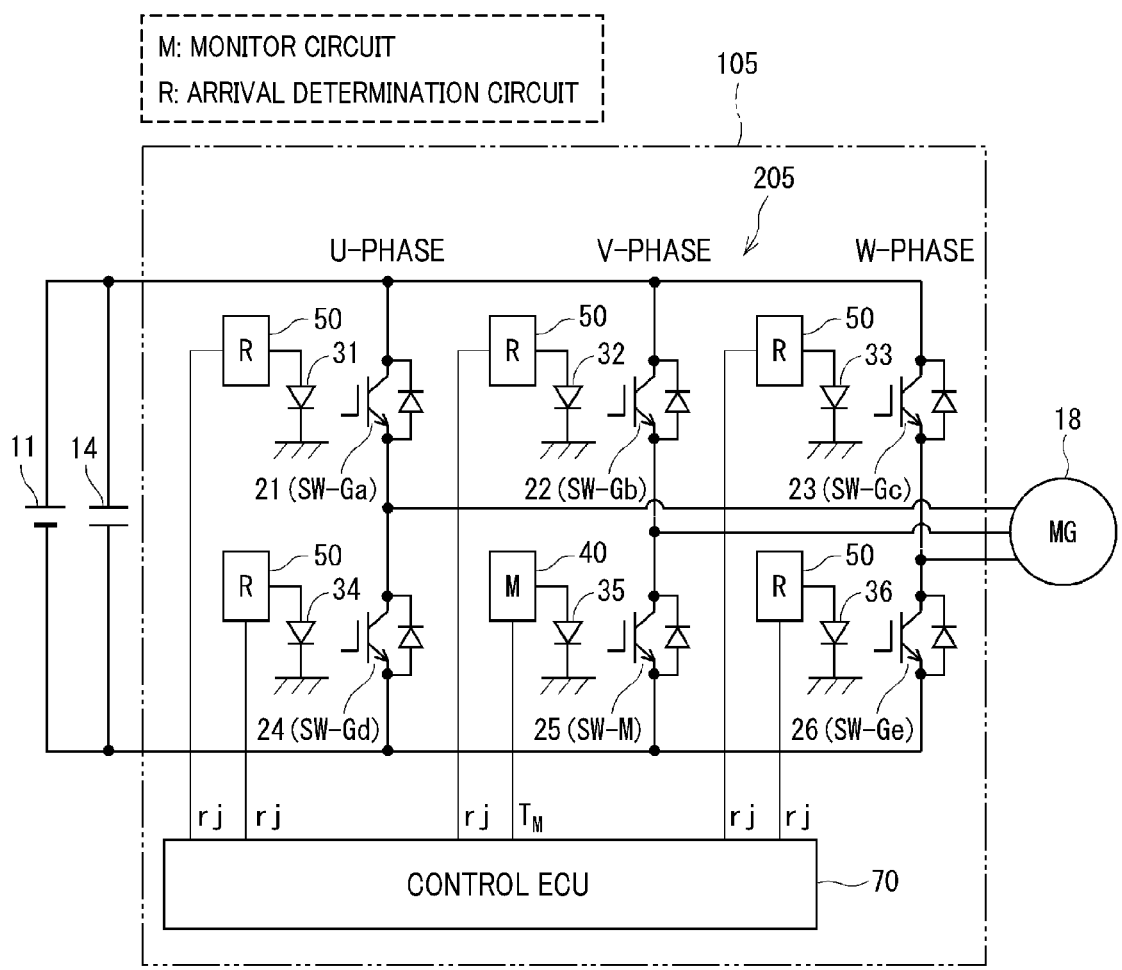
FIG. 18 is a schematic diagram of a power conversion apparatus according to a fifth embodiment.

In FIGS. 17 and 18, the same reference numbers as those in FIG. 1 according to the first embodiment are used as the reference numbers for the switching elements and the control ECU. However, regarding the plurality of switching elements 21 to 26, the numbering merely means first to sixth among the switching elements configuring the power conversion circuit. From a functional perspective of the power conversion circuit, the plurality of switching elements 21 to 26 are not necessarily considered to have approximately identical configurations. In FIG. 1, the reference numbers 24, 25, and 26 are used for the three elements based on the commonality in arrangement with the circuit in FIG. 17. In addition, although the input quantities of monitored temperatures TM and arrival determination signals rj differ among the control ECUs 70 in FIGS. 1, 17, and 18, the control ECUs 70 are given the same reference number based on the interpretation that control ECUs 70 are approximately identical in terms of processes that are performed.

A power conversion apparatus 104 according to the fourth embodiment shown in FIG. 17 includes a buck-boost converter 204 as the power conversion apparatus.

For example, in a system that drives a motor generator as a load, both a power-running operation and a regenerative operation are performed. In the power-running operation, the motor generator is driven by consuming electric power discharged from the battery 11. In the regenerative operation, the battery 11 is charged with electric power generated by the motor generator. In such a system, the buck-boost converter 204 boosts the voltage of the battery 11 and supplies the boosted voltage to the load 16 during the power-running operation of the motor generator. The buck-boost converter 204 steps down the voltage on the load 16 side and regenerates the battery 11 during the regenerative operation.

In relation to the boost converter 201 in FIG. 1, in the buck-boost converter 204 in FIG. 17, a plurality of switching elements 21, 22, and 23 are connected in parallel between the output terminal of the reactor 13 and the high-potential side of the smoothing capacitor 14. That is, the buck-boost converter 204 is composed of a plurality of upper-arm switching elements 21, 22, and 23, and a plurality of lower-arm switching elements 24, 25, and 26. In the example in FIG. 17, three switching elements each, that is, a total of six switching elements are used in the upper arm and the lower arm. As is known, the switching elements of the upper arm and the lower arm perform switching operations so as to turn ON and OFF in a complementary manner.

During the power-running operation of the motor generator, as a result of operation of the plurality of lower-arm switching elements 24, 25, and 26, the voltage of the battery 11 is boosted using energy stored in the reactor 13, and the smoothing capacitor 14 on the load 16 side is charged. In addition, during the regenerative operation of the motor generator, as a result of operation of the plurality of upper-arm switching elements 21, 22, and 23, the voltage on the load 16 side is stepped down and the battery 11 is regenerated.

In the buck-boost converter 204, the extent of heat generation differs between the group of plurality of upper-arm switching elements 21, 22, and 23 and the group of plurality of lower-arm switching elements 24, 25, and 26.

Therefore, the center switching element 22 of the upper arm and the center switching element 25 of the lower arm are selected as the monitored elements SW-MU and SW-ML, respectively. The monitor circuits 40 are connected to the corresponding temperature-sensitive diodes 32 and 35. The remaining four switching elements 21, 23, 24, and 26 are respectively general elements SW-Ga, Gb, Gc, and Gd. The arrival determination circuits 50 are provided for the corresponding temperature-sensitive diodes 31, 33, 34, and 36. In addition, the arrival determination circuits 50 for the monitored elements SW-MU and SW-ML may also be provided as according to the third embodiment.

The configuration of the output limitation process by the control ECU 70 is similar to that according to the first or second embodiment. In addition, the arrival determination circuit correcting unit 75 may be provided as according to the third embodiment.

A power conversion apparatus 105 according to the fifth embodiment shown in FIG. 18 includes an inverter 205 as the power conversion circuit. The inverter 205 converts direct-current power received from the battery 11 to three-phase alternating-current power and supplies the three-phase alternating-current power to a motor generator (MG in FIG. 18) 18. The motor generator 18 is a three-phase alternating-current motor. The buck-boost converter 204 according to the fourth embodiment may be provided between the battery 11 and the inverter 205.

In the inverter 205, the six switching elements 21 to 26 of the upper and lower arms are connected by bridge connection. For example, the switching elements 21, 22, and 23 are respectively U-phase, V-phase, and W-phase upper-arm switching elements. The switching elements 24, 25, and 26 are respectively U-phase, V-phase, and W-phase lower-arm switching elements.

In the inverter 205, the plurality of switching elements 21 to 26 are operated based on drive signals, such as pulse-width modulation (PWM) signals, input to the gates. The inverter 205 thereby controls the output of the motor generator 18 by applying three-phase voltage based on voltage command to each phase winding of the motor generator 18. Here, unless the motor generator 18 is in a locked state in which rotation of the motor generator 18 is stopped, the current flowing to the switching element of each phase is identical. In addition, when the duty of PWM control is an average of 50%, the currents flowing to the U-phase, V-phase, and W-phase upper-arm switching elements 21, 22, and 23 and the U-phase, V-phase, and W-phase lower-arm switching elements 24, 25, and 26 are identical. Therefore, it is assumed that heat generation does not significantly differ among the switching elements 21 to 26.

Therefore, of the six switching elements 21 to 26, the center switching element 25 of the lower arm is selected as the monitored element SW-M. The monitor circuit 40 is connected to the corresponding temperature-sensitive diode 35. The remaining five switching elements 21, 22, 23, 24, and 26 are general elements SW-Ga, Gb, Gc, Gd, and Ge. The arrival determination circuits 50 are provided for the corresponding temperature-sensitive diodes 31, 32, 33, 34, and 36. In addition, the arrival determination circuit 50 for the monitored element SW-M may also be provided as according to the third embodiment.

The configuration of the output limitation process by the control ECU 70 is similar to that according to the first or second embodiment. In addition, the arrival determination circuit correcting unit 75 may be provided as according to the third embodiment.

In a power conversion circuit that includes a plurality of switching elements that operate on substantially identical levels and of which thermal conditions are relatively similar, as according to the fourth and fifth embodiments, the effects of the output limitation process according to the first or second embodiment can be similarly achieved.

In addition, as a variation example according to the fifth embodiment, in a configuration in which two switching elements each are provided for each phase in the upper and lower arms of the inverter and connected in parallel, an example in which a single switching element among the twelve switching elements is selected as the monitor SW-M can be considered. In this way, as the number of general elements SW-G* corresponding to the single monitored element SW-M increases, the effect of reducing the number of monitor circuits 40 and reducing apparatus size becomes more significant, compared to a configuration in which the monitor circuits 40 are provided for all elements and all element temperatures are detected.

Other Embodiments (1) According to the above-described embodiments, the temperature-sensitive diode is used as the temperature output unit that outputs the analog temperature signal based on the temperature of the switching element. In addition to the temperature-sensitive diode, a temperature detector, such as a bimetal thermostat, may be used as the temperature output unit.

(2) According to the above-described embodiments, the passing temperature $T_{OG}$ is uniformly set regardless of the element. However, the passing temperature may be set for each element.

(3) The power conversion apparatus of the present disclosure is not limited to use in a system that drives a motor generator of a hybrid car or the like. The power conversion apparatus may also be used in any system in which power is converted through operation of a plurality of switching elements.

The present disclosure is not limited in any way by the above-described embodiments. The present disclosure may be carried out according to various modes without departing from the spirit of the disclosure.

What is claimed is:

1. A power conversion apparatus comprising:
   a power conversion circuit that converts received electric power and outputs converted electric power through operation of a plurality of switching elements comprising at least one monitored element and at least one non-monitored element, the monitored element being at least one switching element that is selected from the switching elements, the non-monitored element being at least one switching element of the switching elements other than the monitored element;
   a plurality of temperature output units that output analog temperature signals based on individual temperatures of the switching elements;
   at least one monitor circuit that is provided for the monitored element, and monitors over time a temperature of the monitored element based on the analog temperature signals received from the temperature output units;
   at least one arrival determination circuit that is provided for the at least one non-monitored element, determines that a temperature of the non-monitored element has increased and reached a predetermined passing temperature based on the analog temperature signals received from the temperature output units, and outputs arrival determination signals indicating that the temperature of the non-monitored element has reached the passing temperature at an arrival determination time;
   a temperature estimating unit that, based on the temperature of the monitored element monitored by the monitor circuit and the arrival determination signals received from the arrival determination circuit, obtains a temperature difference by subtracting a current temperature of the monitored element at the arrival determination time from an output limitation temperature set for the monitored element, obtains a temperature difference by subtracting a current temperature of the non-monitored element at the arrival determination time from an output limitation temperature set for the non-monitored element, and estimates a limitation subject temperature that is the temperature of the monitored element or the non-monitored element having a smallest temperature difference among the temperature difference of the monitored element and the temperature difference of the non-monitored element; and
   an output limiting unit that starts output limitation of the power conversion circuit when the limitation subject temperature reaches the output limitation temperature of the monitored element or the non-monitored element, wherein
   the temperature estimating unit
      recognizes, when the arrival determination circuit determines that the temperature of the non-monitored element has reached the passing temperature before the temperature of the monitored element reaches the passing temperature, the non-monitored element as a non-monitored specific element, and
      estimates, when the temperature difference of the non-monitored element being recognized as the specific non-monitored element is smaller than the temperature difference of the monitored element at the arrival determination time, a learning temperature of the non-monitored specific element that is a temperature obtained by adding a difference between the passing temperature and the temperature of the monitored element at the arrival determination time to the temperature of the monitored element, and
   the output limiting unit
      sets the limitation subject temperature to the temperature of the monitored element before the arrival determination time,
      sets the limitation subject temperature to the learning temperature of the non-monitored specific element after the arrival determination time, and
      determines whether or not to start output limitation of the power conversion circuit using the set limitation subject temperature.

2. The power conversion apparatus according to claim 1, wherein:
   the at least one non-monitored element comprises a plurality of non-monitored elements that includes a first non-monitored element and a second non-monitored element; and
   when the first non-monitored element reaches the passing temperature at a first arrival determination time and is recognized as a first non-monitored specific element, and subsequently, the second non-monitored element reaches the passing temperature and is recognized as a second non-monitored specific element at a second arrival determination time before the learning temperature of the first non-monitored specific element reaches the output limitation temperature,
   the output limiting unit sets the limitation subject temperature to the learning temperature of the non-monitored specific element having a smaller temperature difference of the temperature difference of the first non-monitored element and the temperature difference of the second non-monitored element at the second arrival determination time, and determines whether or not the limitation subject temperature has reached the output limitation temperature.

3. The power conversion apparatus according to claim 2, wherein:
   the output limitation temperature of the monitored element is set to a temperature equal to or lower than a temperature obtained by subtracting a first group margin for the temperature of the monitored element from a heat-resistance temperature of the switching element, the first group margin being defined by a sum of an analog output error of the temperature output unit, a detection error of the monitored circuit, and a temperature variation width; and the output limitation temperature of the non-monitored element is set to a temperature equal to or lower than a temperature obtained by subtracting a second group margin for the temperature of the non-monitored element from the heat-restriction temperature of the switching element, the second group margin being defined by a sum of an analog output error of the temperature output unit, a detection error of the arrival determination circuit, a heat generation difference, and a temperature variation width, the heat-generation difference being a difference that occurs based on loss variation between the non-monitored specific element and the monitored element during a period from the arrival determination time until the start of output limitation when the non-monitored element is recognized as the non-monitored specific element.

4. The power conversion apparatus according to claim 3, wherein:
the temperature variation width is set to a value that is equal to or greater than a temperature change caused by transient operation of the power conversion circuit due to an external disturbance that is not trackable by output control.

5. The power conversion apparatus according to claim 4, further comprising:
an analog output correcting unit that corrects analog output errors of the temperature output unit, wherein
the output limitation temperature is set such that the analog output errors in the first group margin and the second group margin are considered to be zero.

6. The power conversion apparatus according to claim 5, wherein:
the analog output correcting unit stores a predetermined correction value for analog output errors for each individual temperature output unit in a non-volatile memory.

7. The power conversion apparatus according to claim 6, further comprising:
an arrival determination circuit correcting unit that corrects an initial detection error of the at least one arrival determination circuit, wherein
the detection error of the arrival determination circuit that is a subject for correction by the arrival determination circuit correcting unit is set by a temperature characteristics deterioration error that is an error based on the effects on temperature characteristics caused by a temperature difference from a reference temperature in which the initial detection error is set or an error based on deterioration of the arrival determination circuit after an initial stage.

8. The power conversion apparatus according to claim 7, further comprising:
an arrival determination circuit for the monitored element that is provided in correspondence to the monitored element, and is a subject for correction by the arrival determination circuit correcting unit, wherein
the temperature of the monitored element after the arrival determination time is corrected based on the temperature corrected by the arrival determination circuit correcting unit, when the arrival determination circuit for the monitored element determines that the monitored element has arrived at the passing temperature, and
the output limitation temperature of the monitored element is set such that the detection error of the monitor circuit in the first group margin is set by the temperature characteristics deterioration error of the arrival determination circuit for the monitored element.

9. The power conversion apparatus according to claim 8, wherein:
the arrival determination circuit corresponding to the non-monitored element is included as a subject for correction by the arrival determination circuit; and
the output limitation temperature of the non-monitored element is set such that the detection error of the arrival determination circuit in the second group margin is set by the temperature characteristics deterioration error of the arrival determination circuit corresponding to the non-monitored element.

10. The power conversion apparatus according to claim 9, wherein:
the arrival determination circuit correcting unit stores a correction value for a predetermined initial determination error for each individual arrival determination circuit in a non-volatile memory.

11. The power conversion apparatus according to claim 7, wherein:
the arrival determination circuit corresponding to the non-monitored element is included as a subject for correction by the arrival determination circuit; and
the output limitation temperature of the non-monitored element is set such that the detection error of the arrival determination circuit in the second group margin is set by the temperature characteristics deterioration error of the arrival determination circuit corresponding to the non-monitored element.

12. The power conversion apparatus according to claim 7, wherein:
the arrival determination circuit correcting unit stores a correction value for a predetermined initial determination error for each individual arrival determination circuit in a non-volatile memory.

13. The power conversion apparatus according to claim 3, further comprising:
an analog output correcting unit that corrects analog output errors of the temperature output unit, wherein
the output limitation temperature is set such that the analog output errors in the first group margin and the second group margin are considered to be zero.

14. The power conversion apparatus according to claim 3, further comprising:
an arrival determination circuit correcting unit that corrects an initial detection error of the at least one arrival determination circuit, wherein
the detection error of the arrival determination circuit that is a subject for correction by the arrival determination circuit correcting unit is set by a temperature characteristics deterioration error that is an error based on the effects on temperature characteristics caused by a temperature difference from a reference temperature in which the initial detection error is set or an error based on deterioration of the arrival determination circuit after an initial stage.

15. The power conversion apparatus according to claim 1, wherein:
the output limitation temperature of the monitored element is set to a temperature equal to or lower than a temperature obtained by subtracting a first group margin for the temperature of the monitored element from a heat-resistance temperature of the switching element, the first group margin being defined by a sum of an analog output error of the temperature output unit, a detection error of the monitored circuit, and a temperature variation width; and the output limitation temperature of the non-monitored element is set to a temperature equal to or lower than a temperature obtained by subtracting a second group margin for the temperature of the non-monitored element from the heat-restriction temperature of the switching element, the second group margin being defined by a sum of an analog output error of the temperature output unit, a detection error of the arrival determination circuit, a heat generation difference, and a temperature variation width, the heat-generation difference being a difference that occurs based on loss variation between the non-monitored specific element and the monitored element during a period from the arrival determination time until the start of output limitation when the non-monitored element is recognized as the non-monitored specific element.

* * * * *